US008839003B2

(12) United States Patent
Tani

(10) Patent No.: US 8,839,003 B2
(45) Date of Patent: Sep. 16, 2014

(54) INFORMATION MANAGEMENT SYSTEM, INFORMATION MANAGEMENT METHOD AND APPARATUS, AND ENCRYPTION METHOD AND PROGRAM

(75) Inventor: Okie Tani, Tokyo (JP)

(73) Assignee: Tani Electronics Corporation, Tokyo (JP)

(*) Notice: Subject to any disclaimer, the term of this patent is extended or adjusted under 35 U.S.C. 154(b) by 195 days.

(21) Appl. No.: 12/974,545

(22) Filed: Dec. 21, 2010

(65) Prior Publication Data

US 2011/0154063 A1 Jun. 23, 2011

(30) Foreign Application Priority Data

Dec. 22, 2009 (JP) ................................. 2009-290282

(51) Int. Cl.
| | |
|---|---|
| G06F 12/14 | (2006.01) |
| G06F 21/24 | (2006.01) |
| G06F 21/62 | (2013.01) |
| G06F 21/60 | (2013.01) |

(52) U.S. Cl.
CPC .......... *G06F 21/602* (2013.01); *G06F 21/6209* (2013.01)
USPC ......................................... 713/193; 713/165

(58) Field of Classification Search
CPC ....... H04L 9/00; H04L 9/0866; G06F 21/602; G06F 21/6209
USPC .................................................. 713/193, 165
See application file for complete search history.

(56) References Cited

U.S. PATENT DOCUMENTS

| 4,853,962 A | * | 8/1989 | Brockman ....................... 380/44 |
| 5,003,251 A | * | 3/1991 | Fuoco ....................... 324/750.15 |
| 5,101,296 A | * | 3/1992 | Bell ........................... 359/486.02 |
| 5,369,261 A | * | 11/1994 | Shamir ............................ 235/469 |

(Continued)

FOREIGN PATENT DOCUMENTS

| JP | 2009-218800 A | 9/2009 |
| TW | 200817969 A | 4/2008 |
| TW | 200905516 A | 2/2009 |
| WO | WO 00/72228 A1 | 11/2000 |

OTHER PUBLICATIONS

Taiwan IPO Search Report mailed in Taiwan Application No. 099144996.

*Primary Examiner* — Jung Kim
*Assistant Examiner* — Thomas Ho
(74) *Attorney, Agent, or Firm* — Oliff PLC

(57) ABSTRACT

An information management system provided with an encrypting means for encrypting an original file to prepare an encrypted file, a data storage memory which stores the encrypted file, a decrypting means, a general memory, an information managing means for decrypting the encrypted file to an editable display file etc. and storing it in the general memory in a regular operational processing cycle, performing the required editing in the form of the display file etc., converting the display file etc. after editing to an encrypted file by the encrypting means, and storing this in the data storage memory, and an information management file which controls processing of or operations on the encrypted file by the information managing means. This standardizes information management at the different levels of an organization, managers, etc., enables secure protection and management of information contained in the different machinery and equipment, lightens the load of information management, prevents leakage of information, and preserves and protects files and prevents their destruction, tampering, and alteration.

38 Claims, 39 Drawing Sheets

(56) References Cited

U.S. PATENT DOCUMENTS

| | | | |
|---|---|---|---|
| 5,715,316 A * | 2/1998 | Steenblik et al. | 380/54 |
| 6,879,988 B2 * | 4/2005 | Basin et al. | 1/1 |
| 7,006,248 B1 * | 2/2006 | Tani | 358/1.9 |
| 7,484,103 B2 | 1/2009 | Woo et al. | |
| 7,656,555 B2 * | 2/2010 | Tani | 358/1.9 |
| 2011/0081077 A1 * | 4/2011 | Tani | 382/166 |

* cited by examiner

FIG. 6

| Function of information management | Information management file configuration | Substantive file | Summary of security |
|---|---|---|---|
| · Encryption/ decryption | · ONC correspondence table identification number table | · ONC correspondence table | · Store only color file obtained by color encrypting original file in hard disk and automatically delete original file<br>· By changing ONC correspondence file, usage of color file can be restricted |
| | · Organization division table<br>· Organization rank table | · Division-wise ONC correspondence table<br>· Rank-wise ONC correspondence table | · Only persons with access right division-wise and rank-wise can decrypt and utilize color file. Range of viewing and range of file operations are limited division-wise and rank-wise |
| · File management | · File name double management table<br>· Appended matter file | · Color file<br>· Original file | · File name double management is comprised of hidden color file in hidden folder and color file identification number and cannot be discerned by third parties.<br>· Input and storage of file is rejected |
| · File operation restriction | · Appended matter (file operation) | · Original file<br>· Color file<br>· Display file | · Preparation, change, deletion, movement, input, and storage of file (including attached files) are controlled |
| · File information takeout prohibition | · External recording device identification number | | · External recording device of unregistered identification number/serial number is rejected |

FIG. 7

| Original file name | Color file identification number | Storage folder name (bus) |
|---|---|---|
| Original file name 1 | Color file ID1 | Storage folder name of color file ID1 |
| Original file name 2 | Color file ID2 | Storage folder name of color file ID2 |
| Original file name n | Color file IDn | Storage folder name of color file IDn |

→ Operations on color files (reading, storage, deletion, copying, movement)

FIG. 8

| Rank | ONC correspondence table identification number | Color file identification number list |
|---|---|---|
| President | ONC correspondence table ID1 | Color file ID list 1 |
| Department manager | ONC correspondence table ID2 | Color file ID list 2 |
| Section manager | ONC correspondence table ID3 | Color file ID list 3 |
| Staff | ONC correspondence table ID4 | Color file ID list |

→ Operation on ONC correspondence table

→ Operation on color file

FIG. 9

| Organization division | | ONC correspondence table identification number | Color file identification number list |
|---|---|---|---|
| Common to entire company | | ONC correspondence table ID00 | Color file ID list 00 |
| Department A | Common | ONC correspondence table IDa0 | Color file ID list a0 |
| | Section 1 | ONC correspondence table IDa1 | Color file ID list a1 |
| | Section 2 | ONC correspondence table IDa2 | Color file ID list a2 |
| Department B | Common | ONC correspondence table IDb0 | Color file ID list b0 |
| | Section 1 | ONC correspondence table IDb1 | Color file ID list b1 |
| | Section 2 | ONC correspondence table IDb2 | Color file ID list b2 |
| | Section 3 | ONC correspondence table IDb2 | Color file ID list b2 |
| Department C | Common | ONC correspondence table IDc0 | Color file ID list c0 |
| | Section 1 | ONC correspondence table IDc1 | Color file ID list c1 |
| | Section 2 | ONC correspondence table IDc2 | Color file ID list c2 |
| | Section 3 | ONC correspondence table IDc2 | Color file ID list c2 |

→ Operation on ONC correspondence table

→ Operation on color file

FIG. 10A

Object-color correspondence table/object-color editor

| Object-color correspondence table preparation | | Object-color editor | | | |
|---|---|---|---|---|---|
| Object O | Color initial setting C | Color Setting change 1 C1' | Setting change 2 C2' | Setting change 3 C3' | Setting change m Cm' |
| O1 | C1 | C11' | C21' | C31' | Cm1' |
| O2 | C2 | C12' | C22' | C32' | Cm2' |
| O3 | C3 | C13' | C23' | C33' | Cm3' |
| Oi | Ci | | | | |
| On | Cn | C1n' | C2n' | C3n' | Cmn' |

→ Color partial space allocation

→ Object division (manual/automatic)

FIG. 10B

Object-color number correspondence table/object-color number editor

| Object-color number correspondence table preparation | | Object-color number editor | | | | |
|---|---|---|---|---|---|---|
| Object O | Color number initial setting N | Color number | | | | |
| | | Setting change 1 N1' | Setting change 2 N2' | Setting change 3 N3' | | Setting change m Nm' |
| O1 | 1 | N11' | N21' | N31' | | Nm1' |
| O2 | 2 | N12' | N22' | N32' | | Nm2' |
| O3 | 3 | N13' | N23' | N33' | | Nm3' |
| Oi | i | | | | | |
| On | n | N1n' | N2n' | N3n' | | Nmn' |

→ Object division (manual/automatic)

FIG. 10C

Color-color number correspondence table/Color-color number editor

| Color-color number correspondence table preparation | | Color-color number editor | | | |
|---|---|---|---|---|---|
| Color C | Color number initial setting N | Color number | | | |
| | | Setting change 1 N1' | Setting change 2 N2' | Setting change 3 N3' | Setting change m Nm' |
| C1 | 1 | N11' | N21' | N31' | Nm1' |
| C2 | 2 | N12' | N22' | N32' | Nm2' |
| C3 | 3 | N13' | N23' | N33' | Nm3' |
| Ci | i | | | | |
| Cn | n | N1n' | N2n' | N3n' | Nmn' |

→ Color partial space allocation

FIG. 14

Addition to appended matter/information management file

| Category | Appended conditions | Conditional execution control | Coverage | Examples |
|---|---|---|---|---|
| Information leakage | Comparison of PC identification numbers | Startup | Information management system | Comparative check of PC identification number embedded in information management system |
| | Permission/rejection of preparation | Preparation | Color file | Preparation of color file from original file in initial processing of color encryption |
| | | Rejection | Original file | Rejection of original file by initialization processing of file |
| | Permission/rejection of deletion | Deletion | Original file | Deletion of original file after initial processing of color encryption of original file |
| | Permission/rejection of movement (copying) | Movement (copying) | Color file | Movement (copying) of color file to external recording device (Movement permitted = file double management/hidden folder/takeout of hidden file) |
| | Permission/rejection of transfer | Transfer (e-mail) | Color file | Transfer of color file (e-mail attachment) (Movement permitted = file double management/hidden folder/takeout of hidden file) |
| | Permission/rejection of change | Encryption | Color file | Updating of color file accompanied with editing of original file |
| | Permission/rejection of copying | Copying | Display file | Copying of display file of PC not permitted in relation to appended matter of correspondence table. (Copying rejected 1 = rejection of connection of unregistered external recording device) (Copying rejected 2 = deletion/logging of stored source file) |
| | Permission/rejection of transfer | Transfer (e-mail) | Display file | Issue of how to disable transfer of file for which encryption is reversed (Transfer rejected 1 = conversion to color file/freezing of e-mail execution file) (Transfer rejected 2 = blocking of Internet connection) |
| | Permission/rejection of printing | Printing | Display file | Control of print output of display file by appended conditions (Printing rejected 1 = printing permission given by password input screen) (Printing rejected 2 = conversion to color file/freezing of printer driver) |

FIG. 15

Addition to appended matter/ONC correspondence table

| Category | Appended conditions | Conditional execution control | Coverage | Examples |
|---|---|---|---|---|
| Information leakage | Comparison of PC identification number Comparison of appended matter (fixed conditions) | Decryption rejected | Color file Original file | In example of loss, theft, or use by malicious party of correspondence table, since PC is designated by appended matters, use is not possible even if color file is acquired. File not meeting conditions is rejected. |
| | Permission/ rejection of movement | Movement (copying) | Color file | ONC correspondence table used for management of copying and movement (Movement permitted = file double management/hidden folder/takeout of hidden file) |
| | Permission/ rejection of removement | Removement | Color file | Manager controls removement in relation to appended matter of correspondence table. (Movement permitted = file double management/hidden folder/takeout of hidden file) |
| | Permission/ rejection of copying | Copying | Display file | Copying of display file of PC not permitted in relation to appended matter of correspondence table. (Copying rejected 1 = rejection of connection of unregistered external recording device) (Copying rejected 2 = deletion/logging of stored source file) |
| | Permission/ rejection of transfer | Transfer (e-mail) | Display file | Issue of how to disable transfer of file for which encryption is reversed (Transfer rejected 1 = conversion to color file/freezing of e-mail execution file) (Transfer rejected 2 = blocking of Internet connection) |
| | Permission/ rejection of printing | Printing | Display file | Control of print output of display file by appended conditions (Printing rejected 1 = printing permission given by password input screen) (Printing rejected 2 = conversion to color file/freezing of printer driver) |

FIG. 16

Addition to appended matter/color file

| Category | Appended conditions | Conditional execution control | Coverage | Examples |
|---|---|---|---|---|
| Information leakage | Disablement of conversion | Decryption | Color file | Disabling of conversion (no convertible ONC correspondence table) |
| Delivery | Setting of playback time | Decryption | Color file | Time limit |
|  | Setting of playback time limit | Decryption | Color file | Limit of usage period |
| Download of illegitimate file | Comparison of PC identification number | Decryption | Color file | Specification of user (identification code unique to specific device of apparatus) |
|  | Setting of display content | Display of content | MSG file | Prompting of suitable processing, display of commercials, other information etc. |
|  | Setting of playback range | Decryption | Color file | Playback of single song, intro, single stanza |
|  | Setting of playback time limit | Decryption | Color file | Fee-based, free time |
| Illegal copying | Comparison of PC identification number | Decryption | Color file | Protection of owner of right from download of files. Effective against illegal copying. |
|  | Execution counter | Decryption | Color file | Initial playback of file -> promotion of legitimate procedures |
|  | Setting of playback time limit | Decryption | Color file | Test listening or test use etc. -> expanded sales of file<br>Information obtainable by configuration of song listened to by test |
| Download | Comparison of mobile phone identification number | Decryption | Color file | Selection of models of mobile phones/selection of users |
|  | Setting of playback range | Decryption | Color file | Limit on use |
|  | Setting of display content | Display of content | MSG file | Insertion of commercial |
|  | Execution counter | Decryption | Color file | Fee-based, free times of use |

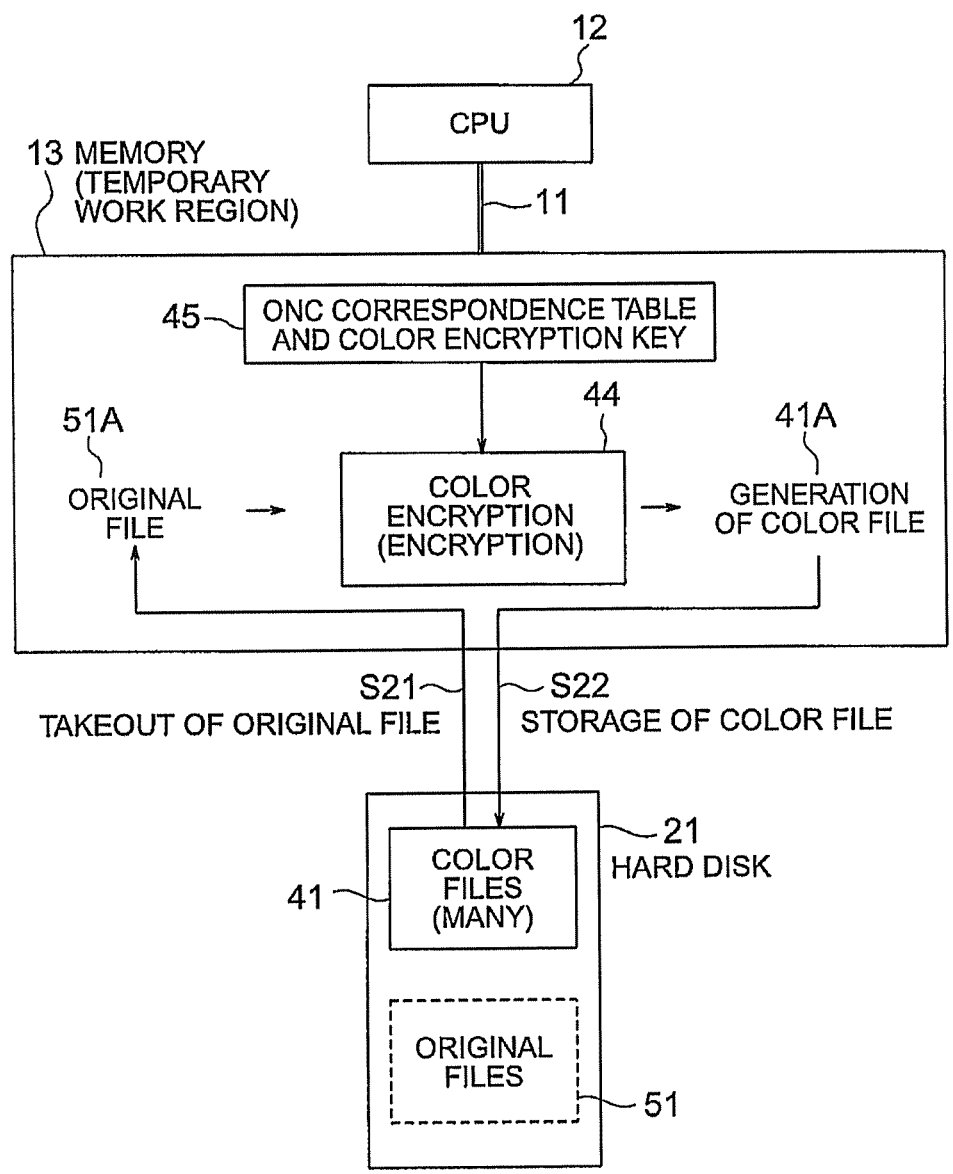

RANDOM NUMBER STRING

| $a_1$ | $b_1$ | $a_2$ | $b_2$ | ... | $a_n$ | $b_n$ | ... |

$a_i^* = a_i$ mod (BIT LENGTH OF ENCRYPTION KEY B)
$b_i^* = b_i$ mod (BIT LENGTH OF ENCRYPTION KEY B)

$a_i^* \geq b_i^* \Rightarrow c = b_i^*, d = a_i^*$ (i=1,2,...,n)
$a_i^* < b_i^* \Rightarrow c = a_i^*, d = b_i^*$ (i=1,2,...,n)

YANK OUT c+1-TH BIT TO d+1-TH BIT TO GENERATE ENCRYPTION KEY

ENCRYPTION KEY B c BITS d+1 BITS

ENCRYPTION KEY

| $e_1$ | ... | $e_{i-1}$ | $e_i$ | $e_{i+1}$ | ... | $e_n$ |

INFORMATION MANAGEMENT SYSTEM, INFORMATION MANAGEMENT METHOD AND APPARATUS, AND ENCRYPTION METHOD AND PROGRAM

BACKGROUND OF THE INVENTION

1. Field of the Invention

The present invention relates to an information management system, information management method and apparatus, and encryption method and program which are designed to deal with the problem of the leakage, invasion of security, alteration, tampering, and destruction of information relating to files (including ordinary files and programs and other executable files) and data, that is, which make partial use of the functions of codes generated by utilizing color etc. for prevention of the leakage, invasion of security, and prevention of alteration, tampering, and destruction and which manage the information unitarily by a standard means so as to prevent the leakage etc.

2. Description of the Related Art

There are diverse means for dealing with the leakage of information handled by computers (personal computers (PCs), servers, etc.), mobile phones, I-phones, recorders/players, game machines, and terminals of units resembling the same (hereinafter referred to as "computers etc."). Encryption, lock-boxing, passwordization, filtering, and numerous other techniques are being employed. As a typical method which can be utilized for encryption, as, the assignee has previously proposed the technique of using color (WO00/72228).

In recent years, in various fields (industry, broadcasting, machinery, public services, consumer services, leisure, etc.), the need for management for prevention of the leakage of various types of information (here, this "information" including technical information relating to the embeded software of machinery and equipment or embeded systems) has been pointed to. At the same time, the leakage of personal information and business relating to the same has become an issue. In actuality, there have been many cases of leakage of information from computers etc. The damage has been great. Means for preventing this are therefore desired. Further, the level of management of information has become a major issue. This tends to be largely governed by the degree of awareness relating to the leakage of information. The lack of management and issue of awareness relating to the leakage of information have been called in question. Prevention of leakage is therefore desired.

Furthermore, unification or standardization of the management of information by organizations, managers, or levels of the same has been desired.

The invention disclosed in the above-mentioned related art document includes the art of encrypting computer objects (meaning individual data or information (including programs (software)) such as characters, symbols, graphics, mathematical formulas, images, video (moving pictures), audio, etc. handled inside computers or through computers, including also software and data handled by the same combined together). Expansion of the scope of application of the art of encryption is desired.

SUMMARY OF THE INVENTION

An object of the present invention, in consideration of the above problems, is to provide an information management system, information management method and apparatus, and encryption method and program which enable unification of information management at organizations, managers, or levels of the same and, due to this, which can lighten the load of information management and prevent the leakage of information.

The above information management system also covers embeded software and embeded systems of machinery and equipment.

The information management system, information management method and apparatus, and encryption method and program according to the present invention are configured as follows for achieving the above object.

The information management system according to the present invention is an information management system for managing a file which is handled on a computer, configured to enable operation on various types of computers, which system is provided with an encrypting means for encrypting an original file comprised of various types of files including at least a document file, drawing file, and executable file (program or software) (this "file" further including images, video (moving pictures), and audio files, a system drive file, and broadcast and other media content) by a conversion function of at least one of an information substitution type and information conversion type so as to prepare an encrypted file; a data storage memory which stores the encrypted file; a decrypting means which has a conversion function which is reverse to the encryption of the encrypting means; a working memory; and an information managing means for enabling the display and viewing of or an operation on the encrypted file, which is stored in the data storage memory, by a regular operational processing cycle after initial processing, by decrypting the encrypted file by the decrypting means to an editable display file (including also application software (AP software)) and storing it in the working memory, for performing the required editing (or, in the case of AP software, execution) by the format of the display file, and for converting the display file by the encrypting means to convert it to the encrypted file and storing this in the data storage memory; the memory further provided with an information management file which controls the processing of or operation on the encrypted file at the information managing means.

The above information management file includes the later explained "appended matter". The "appended matter" is used as the basis for control of the processing of or operation on the encrypted file.

The above information management system is preferably configured so that the data storage memory stores only the encrypted file and does not store the original file corresponding to the encrypted file.

In the above information management system, alternatively, preferably the data storage memory can be configured so as to store the original file together with the encrypted file.

The information management system according to the present invention having the above constitution preferably further is configured as follows:

The encrypting means for encrypting the original file to the encrypted file is a means for encrypting utilizing color. This encrypting is configured so as to include an information substitution type conversion function based on an ONC correspondence table (correspondence of at least one of an ON correspondence, NC correspondence, and CO correspondence) and, furthermore, when necessary, an information conversion type conversion function based on a color encryption key.

The information management system is preferably configured to enable operation on various types of computers (PCs, servers, clients, etc.) and is provided with a startup means for comparing a computer identification number embedded in a system executable file forming part of the information managing means against a computer identification number uniquely assigned to the computer which is used and, when the two match, starting up and, when they do not match, not starting up.

The information management system is preferably configured so that the above information management file includes, as component elements for processing of or operation on the encrypted file, at least one of an ONC correspondence table identification number list (table), an organization division/rank management table, a file double management table, appended matter, and an external recording device identification number list (table).

The information management system is preferably configured so that the encrypting means uses an ONC correspondence table designated by an ONC correspondence table identification number in the ONC correspondence table identification number list which is included in the information management file as the basis to color encrypt the original file at the time of initial processing so as to prepare the encrypted file, and the decrypting means and encrypting means use the designated ONC correspondence table to decrypt the encrypted file or encrypt it again in a regular operational processing cycle.

The information management system is preferably configured provided with a takeout prohibiting means for prohibiting the takeout of file information by an external recording device based on the external recording device identification number list which is included in the information management file.

This information management system is preferably configured so that the takeout prohibiting means, when an external recording device is connected to the system, uses an external recording device identification number list which is included in the information management file as the basis for comparison with an identification number of the external recording device, permits use when the comparison results in a match, and does not permit use when there is no match.

The information management system is preferably configured so that the decrypting means or the encrypting means uses the ONC correspondence table as the basis for encryption and decryption at the time of initial processing or at a regular operational processing cycle, the system is provided with a correspondence table changing means for changing the ONC correspondence table, the correspondence table changing means changes the ONC correspondence table, the ONC correspondence table changed due to this being used as a basis to prepare another encrypted file, and the other encrypted file is able to be decrypted based on the ONC correspondence table after the change and is not able to be decrypted based on the ONC correspondence table before the change.

The information management system is preferably configured so that the ONC correspondence table is changed based on a change of OC correspondence, a change of ON correspondence, or a change of NC correspondence.

The information management system is preferably configured so that the decrypting means and the encrypting means use the ONC correspondence table as the basis for encryption and decryption at the time of initial processing or at a regular operational processing cycle, the system is provided with a correspondence table deleting means for deleting an ONC correspondence table, and the correspondence table deleting means deletes the ONC correspondence table and, due to this, decryption processing is disabled. Alternatively, it is configured so as to encrypt the ONC correspondence table and to use the ONC correspondence table as the basis to disable decryption.

The information management system is preferably configured so as to set conditions for change or deletion of the ONC correspondence table and thereby limit use of the decryption function or limit use of a display file which is decrypted from the encrypted file.

The information management system is preferably configured so as to set conditions of the timing for change or deletion of the ONC correspondence table to thereby perform at least one of limitation of the term, limitation of the time, establishment of a deadline, and limitation of the number of times of execution.

The information management system is preferably configured so as to use the appended matter which is included in the information management file as the basis for automatic or manual conditional execution control, in accordance with appended conditions which are included in the appended matter, of encryption processing, decryption processing, file operations, and file input and storage.

The information management system is preferably configured so that the appended conditions of the appended matter are freely set in content with reference to the objective of the file. Therefore, more preferably:

(1) The system is configured to automatically or manually perform conditional execution control of file operations or file input and storage of an original file.

(2) The system is configured to automatically or manually perform conditional execution control of file operations or file input and storage of a color file (in general, an encrypted file).

(3) The system is configured to automatically or manually perform conditional execution control of file operations or file input and storage of a display file.

(4) The system is configured to encrypt the executable file and disable execution when execution is not permitted.

(5) The system is configured to encrypt e-mail software and disable transfer of a display file when transfer is not permitted.

(6) The system is configured to encrypt a printer driver and disable printing of a display file when printing is not permitted.

Furthermore, the information management system prevents alteration, tampering, editing, and copying of a display file, a homepage (display screen by browser), or a display/viewing screen (display screen by viewer), by a third party (person assuming position equal to manufacturer's side) in accordance with appended conditions included in the appended matter. Due to this, it is possible to prevent tampering, alteration, etc. by "identity theft or spoofing".

From another viewpoint, the present invention provides the following information management system:

The information management system is preferably configured so that, in the steps where the encrypting means encrypts the original file to the encrypted file as initial processing, the decrypting means decrypts the encrypted file to the display file, and the encrypting means again encrypts the display file to the encrypted file, except for the original file, the encrypted file and the display file, elements which are used for the encryption, and elements which are used for the decryption are set with a computer identification number which is uniquely assigned to the computer.

The information management system is preferably configured so that, for computer objects of the file which is managed at the computer under the control of the information management system, the system is configured to enable editing, execution, storage, and deletion of computer objects in the state of the display file, a closed loop environment at the computer is formed based on the state of the encrypted file, and the computer objects in the state of the encrypted file are handled in the closed loop environment.

The information management system is preferably configured so that when the computer objects are stored in the storage memory in the state of the encrypted file, the corresponding original file is deleted.

Furthermore, the information management system is preferably configured so that the system provides an external recording device which can be attached to or detached from the computer and which includes a first recording unit which records an already obtained encrypted file and/or a second recording unit which records elements relating to a conversion function of at least one of an information substitution type and information conversion type and provides contents which are recorded in the first recording unit and the second recording unit to the computer as a module and performs encryption processing by the encrypting means, decryption processing by the decrypting means, and processing for control of execution relating to operations on the file when the external recording device is connected to the computer.

Furthermore, the information management system is preferably configured to use an external recording device which can be attached to or detached from the computer and which is provided with the encrypting means, the storage memory, the decrypting means, the information managing means, and the information management file as a module.

The above computer may be a game machine or a unit terminal device.

Furthermore, in another aspect, the present invention provides the following information management system.

The information management system according to this aspect of the present invention is provided with an encrypting means for encrypting an original file comprised of various types of files including a document file, a drawing file, and an executable file (program) based on at least information substitution type conversion function to prepare an encrypted file; a data storage memory which stores the encrypted file and the original file before the encryption initial processing; and an information managing means for encrypting the original file before encryption initial processing by the encrypting means to the encrypted file then moving or copying it to another external recording device (computer, external recording device, etc.) when there is a request for movement or copying of the original file before encryption initial processing to the other external recording device.

The information management system is preferably configured to encodes the original file before encryption initial processing to the encrypted file at the point of time when a movement destination or copying destination is designated in a request for moving or copying the original file before encryption initial processing to another external recording device.

Further, in another aspect, the present invention provides the following information management method and apparatus.

The information management method according to the present invention is an information management method which is executed in an information management system which uses an encrypting means or decrypting means to encrypt or decrypt an original file and an encrypted file under control based on control-use component elements provided in an information management file, which method prepares a computer identification number such as a MAC address or board serial number, adds the computer identification number to the encrypted file, an encrypting-use correspondence table of the encrypting means, and a decrypting-use correspondence table of the decrypting means, and permits decryption processing of the encrypted file when the condition is satisfied of the computer identification number which is added to the encrypting-use correspondence table and the computer identification number which is added to the decrypting-use correspondence table matching and, due to this, makes a password, which is required for usual encryption, unnecessary.

The information management apparatus according to the present invention is an information management apparatus which is used in an information management system which uses an encrypting means or decrypting means to encrypt or decrypt an original file and an encrypted file under control based on control-use component elements provided in an information management file, which apparatus is provided with a means for preparing a computer identification number such as a MAC address or board serial number, a means for adding the computer identification number to the encrypted file, an encrypting-use correspondence table of the encrypting means, and a decrypting-use correspondence table of the decrypting means, and a means for permitting decryption processing of the encrypted file when the condition is satisfied of the computer identification number which is added to the encrypting-use correspondence table and the computer identification number which is added to the decrypting-use correspondence table matching and makes a password, which is required for usual encryption, unnecessary.

By utilizing the information management system according to the present invention, more specifically, the following configurations can be realized:

(1) An information management system (this information management system including an information management system of files, data, etc. built into machinery or equipment) wherein appended conditions of appended matter (permission/rejection of printing) are followed so that, when the information management system is a printer apparatus for example, the information management system built into the printer by a computer built into the printer apparatus, when deciding to permit or reject printing, permits only printing of the color file (decryption, then printing) and rejects printing of the display file/original file.

(2) An information management system which is built in a printer wherein appended conditions of appended matter of a color file (printing conditions) are followed for automatic conditional execution control of color file printing. As the "appended conditions" (printing conditions), content is set with reference to the use of the printer and the objective to be realized. In this example, this is the printing range (pages), number of printed copies, vertical/horizontal printing, and other settings.

(3) An information management system which uses a color encryption key etc. for encryption/decryption between an original file and an encrypted file under the control of an information management file, wherein appended conditions of appended matter of the information management system (permission/rejection of printing) are followed so that the information management system built into a printer by a computer built into the printer, when deciding to permit or reject printing, permits only printing of the encrypted file (decryption, then printing) and rejects printing of the display file/original file.

(4) An information management system which uses a color encryption key etc. for encryption/decryption between an original file and an encrypted file under the control of an information management file, wherein appended conditions of appended matter (permission/rejection of printing) are followed so that, when deciding to permit or reject printing, the system encodes (freezes) a printer driver to disable printing of the display file.

(5) An information management system configured so as to follow appended conditions of appended matter so as to automatically perform conditional execution control of encryption of an original file. The appended conditions include permission/rejection of encryption, term, time, time limit, range, number of times of execution, etc. and also limitations on the matters required in management.

(6) An information management system configured so as to follow appended conditions of appended matter so as to automatically perform conditional execution control of encryption of a display file. The appended conditions include permission/rejection of encryption, term, time, time limit, range, number of times of execution, etc. and also limitations on the matters required in management.

(7) An information management system configured so as to follow appended conditions of appended matter so as to automatically perform conditional execution control of decryption (restoration) of a color file. The appended conditions include permission/rejection of decryption, term, time, time limit, range, number of times of execution, etc. and also limitations on the matters required in management.

(8) An information management system configured so as to decrypt (restore) a color file, which is obtained by encrypting an original song or video, by automatically performing conditional execution control by appended conditions of appended matter which are added to the color file. The above appended conditions include measures against downloading of illegitimate files by some sort of restrictions on the copied file/playback of a single song, intro, single stanza, etc. and other measures for promoting legitimate procedures, fee-based and free time periods, limitation of range, identification of user (identification code unique to specific device of apparatus), display of commercials, and other information.

(9) An information management system configured so as to decrypt (restore) a color file, which is obtained by encrypting an original file for download use, by automatically performing conditional execution control by appended conditions of appended matter which are added to the color file. The above appended conditions include, when the PC/or mobile phone identification number is unknown or mostly unknown, establishing limits on use and initially enabling restoration of the file so as to promote legitimate procedures and increased sales.

(10) An information management system configured so that appended conditions of appended matter (recorded external recording device identification number list) are followed to run a comparative check of external recording device identification numbers, permit use when matching, display a message screen of "use not permitted" and disable further operations on the PC screen when not matching, and thereby prohibiting the external recording device from taking out file information.

(11) An information management system configured so that so as to set conditions for rejecting execution so as to thereby reject execution of an original file in the permission/rejection in attached conditions with reference to the purpose of confidentiality of blocking intervention by a third party to a high degree in embed software and an embedded system of an apparatus. This is configured to enable automation of decryption of an encrypted file.

(12) An information management system configured so as to use a file double management table of an information management file as the basis to enable access to a color file by the original file name and configured so as to confidentially store the color file of a recording device by standard management.

(13) An information management system configured so that a file double management table of an information management file is comprised of original file names to which color file identification numbers and storage folder names (paths to folder locations) are linked. It is configured so that when an original file name is designated, the color file stored on a hard disk can be accessed using the storage folder name (path to folder location) and color file identification number. A color file is an actual file which has been color encrypted from an original file and does not allow illegitimate viewing of information. On the other hand, the original file itself is automatically deleted after color encryption and no longer exists, so a third party cannot directly take it outside. The original file is generated based on the color file and the correspondence table.

(14) An information management system configured so that the color file identification number is a number which is not suggestive of the original file name, the color file itself is a hidden file, the storage folder is also a hidden folder, and the color file corresponding to the original file cannot be found by a search.

(15) An information management system configured so as to color encrypt an original file to generate a color file at the time of initial processing, automatically delete the original file from a recording device, and store only the color file which has been encrypted based on a file double management table in the recording device. According to this, leakage of raw information of the original file to the outside is prevented. Even if the color-encrypted color file is leaked to the outside, it cannot be decrypted without an ONC correspondence table, so the information will not be illegitimately viewed.

(16) An information management system configured so as to decrypt/encrypt a color file of a recording device at the time of regular operation after initial processing so as to render a display file editable, wherein the display file and a file double management table are used as the basis to confidentially store the color file of the recording device by standard management. Due to this, outside leakage of raw information of the original file is prevented. Even if the color-encrypted color file is leaked to the outside, it cannot be decrypted without an ONC correspondence table, so the information will not be illegitimately viewed.

(17) An information management system configured so as to use an organization division table/organization rank table of an information management file as the basis for decrypting/encrypting a color file in an organization division-wise/organization rank-wise manner and to make the segmentation of security management (prevent of leakage of information to the outside) more detailed and stricter.

(18) An information management system configured so as to use an organization division-wise/organization rank-wise ONC correspondence table comprised of an organization division table/organization rank table of an information management file as the basis for initially color encrypting an original file to generate an organization division-wise/organization rank-wise color file and so as to decrypt/encrypt the organization division-wise/organization rank-wise color file at a regular operational cycle.

(19) An information management system configured to use an ONC correspondence table, which can only be used organization division-wise/organization rank-wise, as the basis for color encrypting an original file to generate an organization division-wise/organization rank-wise color file at the time of initial processing, to decrypt/edit/encrypt an organization division-wise/organization rank-wise color file from a recording device during a cycle of regular operational processing, to store the organization division-wise/organization rank-wise color file in the recording device, to allow the circulation of only the encrypted organization division-wise/ organization rank-wise color file inside the PC used etc., and to manage the security of color files partitioned organization division-wise/organization rank-wise (prevent leakage of information to the outside).

(20) An information management system configured so that when decrypting the organization division-wise/organization rank-wise color file to a display file, the range of use of a display file is restricted. The "range of use of the display file" means the disclosable file region at which file operations (viewing, creation, editing, deletion, copying, and transfer) can be performed.

(21) An information management system configured so that the organization rank table is an ONC correspondence table in which use is permitted for individual ranks showing relationships in a leadership command system in an organization and a table of indices (identification number IDs) of color files.

(22) An information management system configured so that the organization division table is an ONC correspondence table in which use is permitted for individual ranks showing relationships in a leadership command system in an organization and a table of indices (identification number IDs) of color files.

Furthermore the encryption method and program of the present invention are configured as follows:

The encryption method is configured having a first step of extracting a predetermined bit string from any designated key image, a second step of using the bit string to generate a first random number array and repeatedly using a hash function on the first random number array to create a first encryption key, and a third step of combining the first encryption key, separately provided data to be encrypted, and a known processing method for encryption to generate an encrypted file relating to the data to be encrypted.

In the above encryption method, the third step includes a step of using the first encryption key to create a second encryption key, a step of using a hash function on the data to be encrypted to create a file key, a step of using the file key to generate a third random number array, a step of shuffling the second encryption key by the third random number array to create a third encryption key, and a step of applying an XOR operation to the data to be encrypted in bit units by the third encryption key to create the encrypted file.

Furthermore in the above encryption method, the third step includes a step of using the first encryption key to create a second encryption key, a step of using a hash function on the data to be encrypted to create a file key, a step of using the file key to generate a third random number array, a step of shuffling the second encryption key by the third random number array to create a third encryption key, and a step of using the third encryption key as a key for block encryption and using the block encryption as the basis to create the encrypted file from the data to be encrypted.

Further the encryption program is a program for making a computer realize an encryption device and using the encryption device to make the computer run the encryption method.

The information management system according to the present invention has the following effects.

(1) According to the information management system, the system operates under control of an information management file and color encrypts/decrypts an original file as its basic function. It is therefore possible to realize an integrated information management system environment which restricts file operations to prevent outside leakage of file information from an overall perspective.

(2) According to the information management system, a comparative check is made of a PC identification number etc. which is embedded in a system executable file and a PC identification number etc. which is uniquely assigned to the PC used etc. (LAN card MAC address, motherboard serial number, CPU ID, BIOS serial number, hard disk serial number, etc.) If matching, the system is started up. If not matching, the system is not started up. By this, it is possible to prevent illicit use of software.

(3) The information management file is comprised of an ONC correspondence table identification number table (or list), organization division/rank management table, file double management table, appended matter, and external recording device identification number table. Due to this, the security of the file information itself and the access to the file is managed on an organization-wise basis. It is therefore possible to realize an integrated information management system environment which prevents outside leakage of file information from an overall perspective.

(4) In an organization, software etc. on the computer is under the unitary or standard management of a manager and can be controlled. The user can freely create, edit, delete, copy, and transfer a file (including attached files). It is therefore possible to prevent arbitrary changes to the restrictions on permitted functions/hardware usage of a computer imposed by the information management system manager.

(5) A file in which a virus is embedded is also converted to a color file. A file designed for intrusion is therefore encrypted and converted to a color file. The color file is configured to be changed based on a correspondence table, so there is no effect causing a change in a recording. Therefore, the effect is limited to the file in the system. The information management system functions by the color file and the functions of the CPU to prevent file leakage/damage. Therefore, there is also the effect of limiting damage due to viruses. Further, the file is encrypted as a color file, so there are also a sealoff effect and effect of enabling deletion, capture, and analysis.

(6) It is possible to prevent deletion due to work errors, deliberate deletion, etc. This is based on the usage of a color file. It is possible to form a double structure of a color file identification code and a file name (formation of double layer or duplexing of identification code).

(7) It is not possible to copy information which is displayed on a monitor or other display. Even if attempting to copy a file which is displayed on a monitor by dragging and pasting by a mouse, when the copied file is transferred elsewhere, it will be changed by being encrypted to a color file. Furthermore there is copy medium and BIOS management. Utilization of peripheral devices is restricted making copying impossible. Due to this, leakage of information is prevented.

(8) It is possible to maintain the security of and protect the system, data, file, and other information of a high security system. Further, processing for preventing deletion and copying of data in an HDD or other memory is not required.

BRIEF DESCRIPTION OF THE DRAWINGS

The above objects and features of the present invention will become clearer from the following art of the preferred embodiments given in relation to the attached drawings, wherein:

FIG. 6 is a table showing an example of a file configuration of an information management system, FIG. 7 is a table showing an example of the content of a file name double management table, FIG. 8 is a table showing an example of the content of a rank table, FIG. 9 is a table showing an example of the content of an organization division table, FIG. 10A is a table showing an example of content of an object-color correspondence table etc., FIG. 10B is a table showing an example of content of an object-color number correspondence table etc., FIG. 10C is a table showing an example of content of a color-color number correspondence table etc., FIG. 14 is a table showing an example of content of appended matter which is added to an information management file, FIG. 15 is a table showing an example of content of appended matter which is added to an ONC correspondence table, FIG. 16 is a table showing an example of content of appended matter which is added to a color file, FIG. 17 is a view of the configuration for explaining an example of operation for initial processing.

DESCRIPTION OF THE PREFERRED EMBODIMENTS

Below, preferred embodiments of the present invention will be explained based on the drawings.

Figure 1:
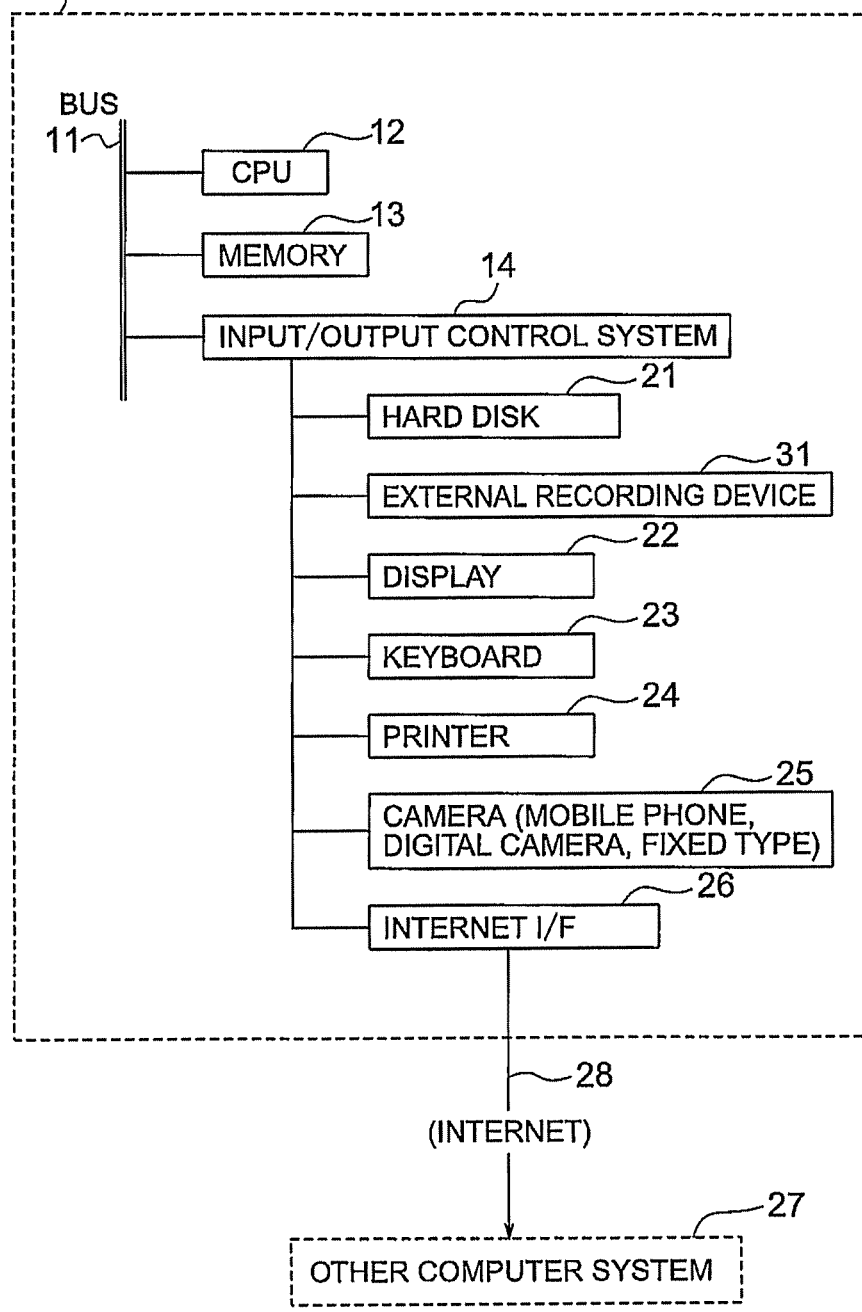
FIG. 1 is a view of a configuration showing a hardware configuration of a computer system to which an information management system according to the present invention is applied.
Figure 2:
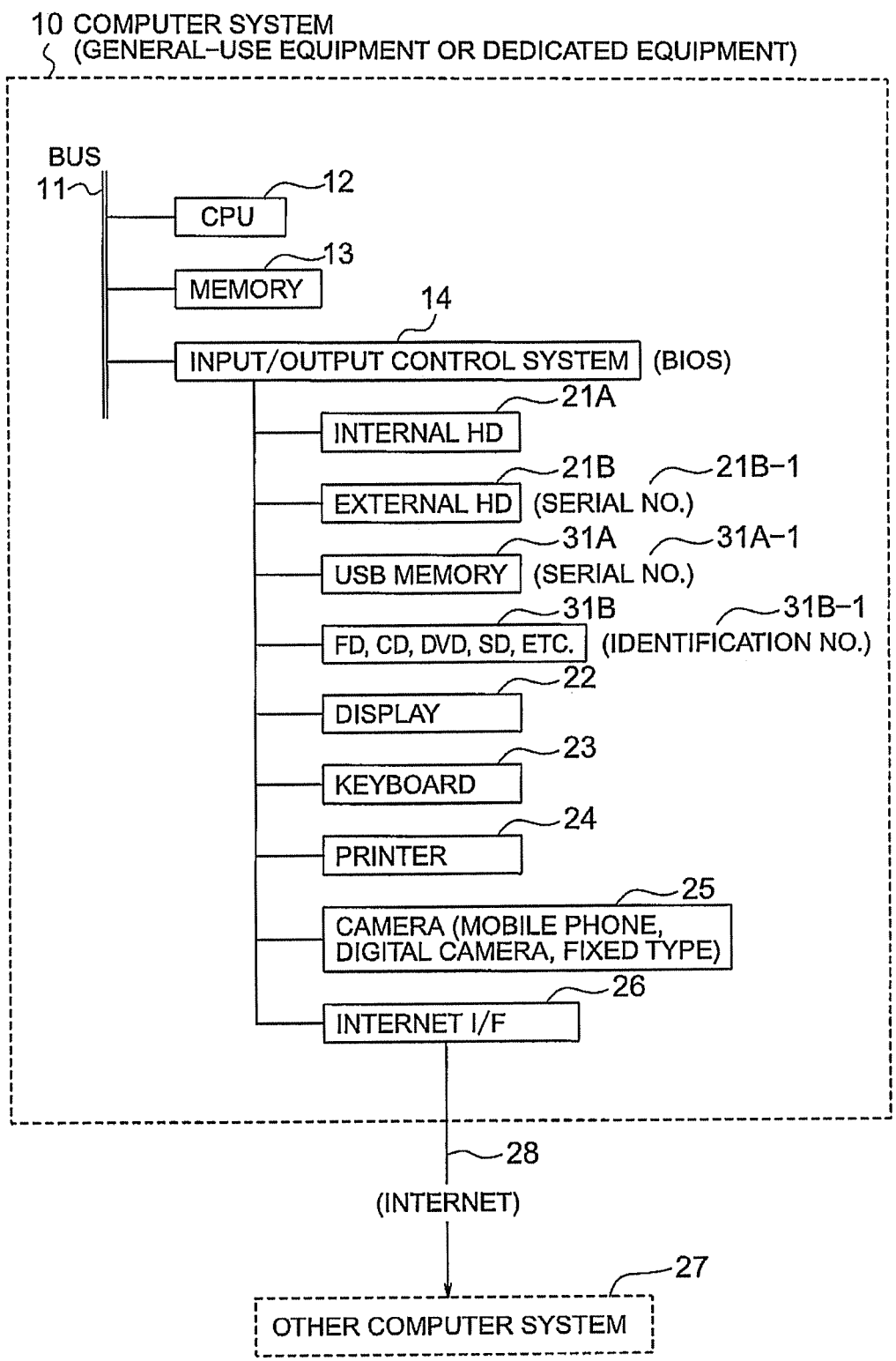
FIG. 2 is a view of a configuration showing in further detail the part of a data storage memory by a hardware configuration of a computer system to which an information management system according to the present invention is applied.

FIG. 1 shows the hardware system of a computer (computer system) in which the information management system according to the present invention is realized. Note that in this computer, it is assumed that a hardware configuration (encryption device) enabling an encryption method which utilizes, representatively, color (or including a so-called "color code") to be performed is built in FIG. 2 shows the relationship of serial numbers etc. assigned to an external recording device etc. in the hardware configuration of this computer.

Note that the means/elements which are utilized for encryption is explained in the present embodiment with reference typically to "color", but is not limited to "color". Other means/elements which have substantially the same action can also be utilized.

FIG. 1 etc. show one computer (or part of a computer system) 10 in a closed computer system based on a computer network. The computer 10 is provided with devices which are connected to each other via a bus 11 such as a CPU (central processing unit) 12, memory (including an ordinary memory, working memory, or memory for temporary work region use) 13, or an input/output controller (input/output control system, BIOS) 14. Furthermore, the input/output controller 14 has connected to it a data storage memory constituted by a hard disk (HD) 21 and external recording device 31, an output device constituted by for example a display 22, an input device constituted by for example a keyboard 23, an output device constituted by a printer 24, a camera (mobile phone camera, digital camera, fixed type) 25, and an Internet interface (Internet I/F) 26 for sending and receiving signals (communicating) with an outside device through the Internet.

Note that the Internet interface 26 may in general also be a communication device. "Communication" is a concept including broadcasting and sending and receiving signals by a communications satellite.

The above hard disk (HD) 21, as shown in FIG. 2, includes an internal HD 21A and an external HD 21B. The internal HD 21A and the external HD 21B will be referred to all together as the "hard disk 21".

As types of the above external recording device 31, as shown in FIG. 2, there are a USB memory 31A, flexible disk (FD), compact disk (CD), DVD, etc. 31B.

These elements 21 to 25 send and receive data with the CPU 12 via the input/output controller 14 and bus 11. Here, the "CPU" has a broad meaning and includes a processor, microprocessor, microcomputer, and DSP.

The external device is at least one other computer (computer system) 27. The computer 10 can communicate with the other computer 27 typically through the Internet or a LAN or other communication line 28 so as to send and receive document files, drawing files, executable files (including various types of programs), various types of other data, and other data and information.

In the above configuration, the memory 13 is a main memory and includes a working memory which temporarily holds data which has been processed by the CPU 12 or data which is in the middle of process. The hard disk 21 (internal HD 21A and external HD 21B) is a storage memory for storing data which has been created by processing by the CPU 12 and which is temporarily held in the memory 13. Further, the external recording device 31 is an external memory and mainly functions as a portable type storage memory.

Note that the above computer 10, as is well known, is a general use device constituted by a personal computer (PC) or other computer of a server etc. or a dedicated device constituted by a computer. The latter dedicated device constituted by a computer is an intelligent device which has a built-in CPU 12, for example, is a stationary or portable type game machine, mobile phone, smart phone, etc., that is, a device for specific applications including the CPU 12. In the case of a computer as such a dedicated device, provision of the above external recording device 31 is restricted by the conditions of the hardware. For example, a semiconductor memory (RAM, ROM) well known as a storage memory may be used. In the following embodiments, for the computer 10, the example of a "PC" will be explained.

In the above system configuration, as shown in FIG. 2, the external HD 21B and the USB memory 31A which can be freely attached to or detached from the computer 10 are respectively assigned the unique "serial numbers" 21B-1 and 31A-1, while the FD or other external recording device 315 is assigned the unique "identification number" 31B-1. In FIG. 2, when the USE memory 31A which has a serial number registered in the computer 10 etc. or external recording device 315 which has a registered identification number is attached to the computer 10, it can connect with the computer 10 and send and receive information with it. In this case, "registered" includes preregistration and new registration at the time of connection. Further, when a USB memory which has a serial number which is not registered in the computer 10 etc. or an external recording device which has an identification number which is not registered is attached to the computer 10, connection with the computer 10 is rejected.

Figure 3:
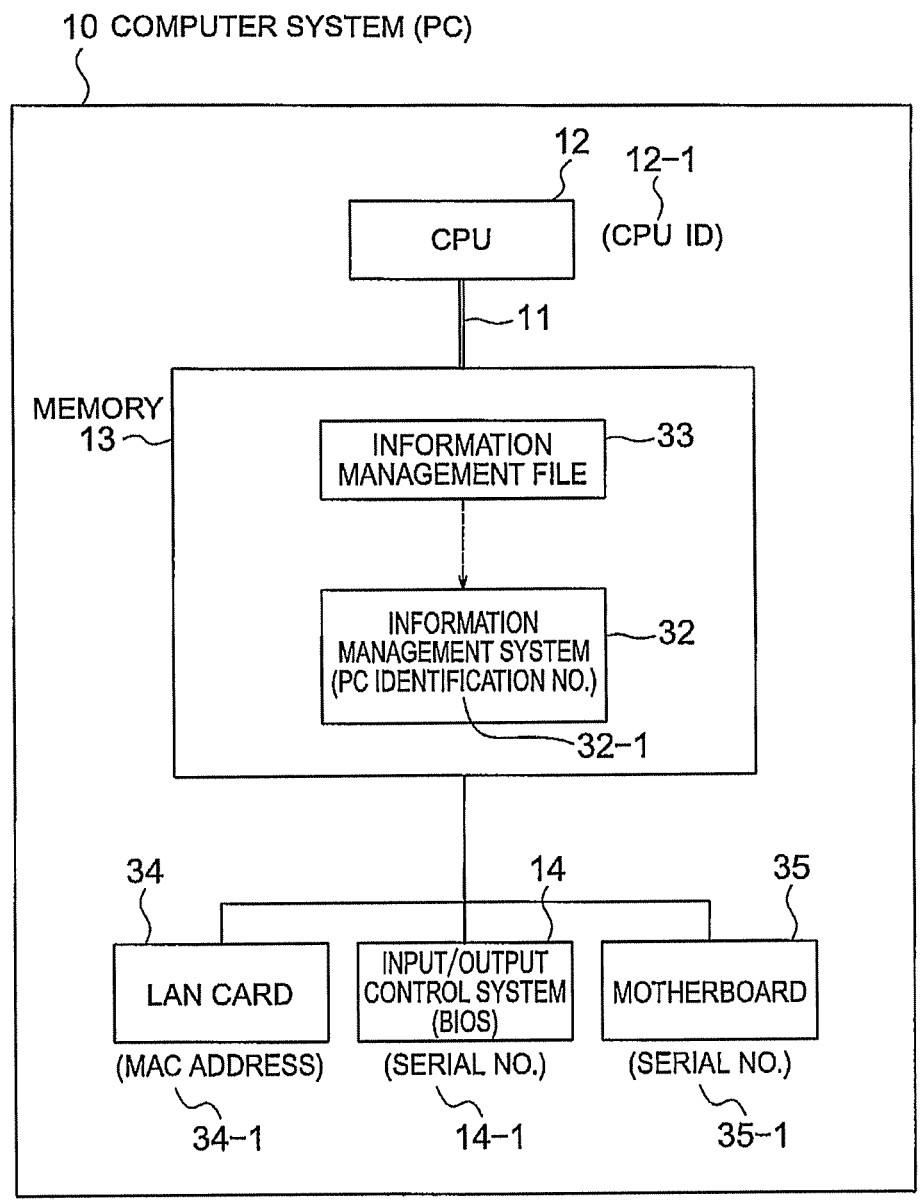
FIG. 3 is a block diagram showing a configuration of an information management system according to the present invention.

FIG. 3 shows the hardware configuration of principal parts and the functions and configurations of the principal parts in a computer 10 having the hardware configuration which is shown in FIG. 1 and FIG. 2.

In FIG. 3, the block 10 designates the above-mentioned computer (computer system). Inside the block of the memory 13, the information management system 32 and information management file 33 according to the present embodiment are shown.

The information management system 32 is the part of the system where functions are realized by a program performing the information management characterizing the present invention (information management by encryption). This information management system 32 is assigned the unique "identification number" 32-1. The computer 10, in this embodiment, is explained in particular with reference to the example of a personal computer (PC), so the identification number 32-1 is a "PC identification number".

Note that as examples of the above "PC identification number" 32-1, in general there are in general a MAC address, motherboard serial number, CPU ID, BIOS serial number, hard disk serial number, etc.

The information management file 33 is a file including various types of data which imposes conditions required for processing when the information management system 32 performs processing requested for a selected file for management. The information management system 32 obtains the data required for processing from the information management file 33.

As hardware elements forming the computer 10, the above-mentioned CPU 12, memory 13, and input/output control system (BIOS) 14 are shown. Furthermore, the LAN card 34 and the motherboard 35 are shown.

Among these hardware elements, the CPU 12 is assigned the "CPU ID" 12-1, the LAN card 34 is assigned the "MAC address" 34-1, the input/output control system 14 is assigned the "serial number" 14-1, and the motherboard 35 is assigned the "serial number" 35-1.

For the hardware elements in the computer (PC) 10, there are the CPU ID 12-1 of the CPU 12, the PC identification number 32-1 of the information management system 32 in the memory 13, the MAC address 34-1 of the LAN card 34, the serial number 14-1 of the input/output control system 14, the serial number 35-1 of the motherboard 35, and the identification number which identifies the computer 10. In general, these are referred to all together as the "computer identification number".

In the configuration of the computer 10 which is shown in FIG. 3, the PC identification number 32-1 embedded in the information management system 32, that is, the system executable file for performing the information management, and the above computer identification number assigned to the computer 10 used (PC identification number: CPU ID 12-1 etc.) are compared against each other in advance. The information management system 32 is started up conditional on the PC identification number and the computer identification number (PC identification number) matching. Conversely, it will not start up when they do not match. Due to this, illegitimate use of the software is prevented.

Next, referring to FIG. 4 and FIG. 5, an example of the operation of the information management system 32 (configuration of functions realized) will be explained.

This example of operation is an example of operation which perform initial processing for first encrypting an original file, that is, a computer object, to a color file and then performs processing during a cycle of regular operational processing after initial processing.

Figure 4:
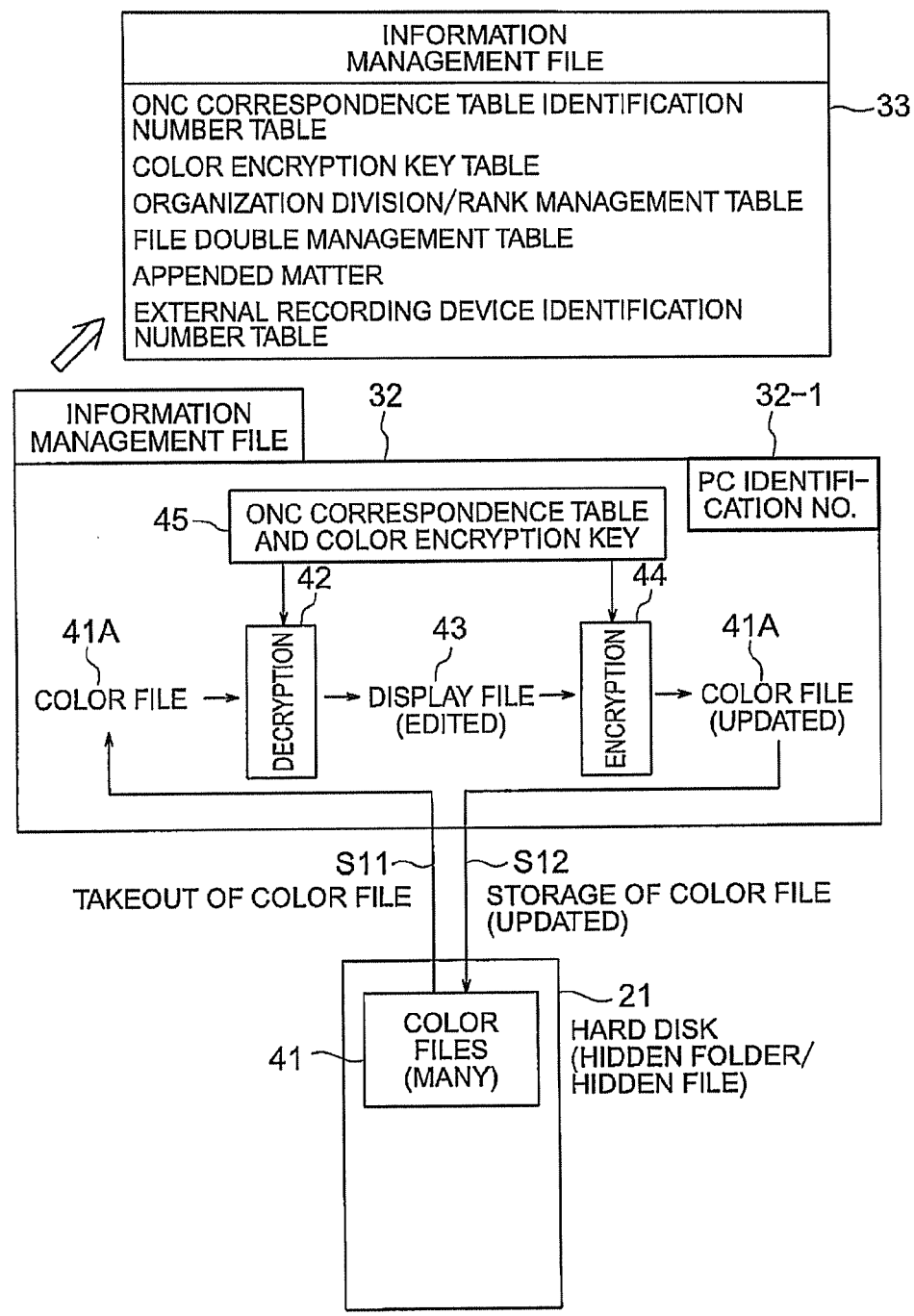
FIG. 4 is a view showing a configuration of a regular operational processing for display software by an information management system.

FIG. 4 shows an example of operation in the case of editing a document file, drawing file, or other ordinary file (display file) etc. Here, "editing" is a concept including "refusal of editing". For editing of a display file, access is allowed in accordance with the displayed content, but deliberate or malicious editing by a third party in contravention of the original intent of the manufacturer is not allowed. Such "refusal of editing" is set by control based on the "appended matter" included in the later explained information management file. This example of editing, for example, is an example of a homepage (display screen by browser), display/viewing screen (display screen by viewer), etc. To prevent screen capture and to prevent malicious tampering, alteration, etc. of the screen content, measures are taken such as the "permission/rejection of change" shown in FIG. 14 and the "disabling of conversion" of the "appended conditions" shown in FIG. 16.

Figure 5:
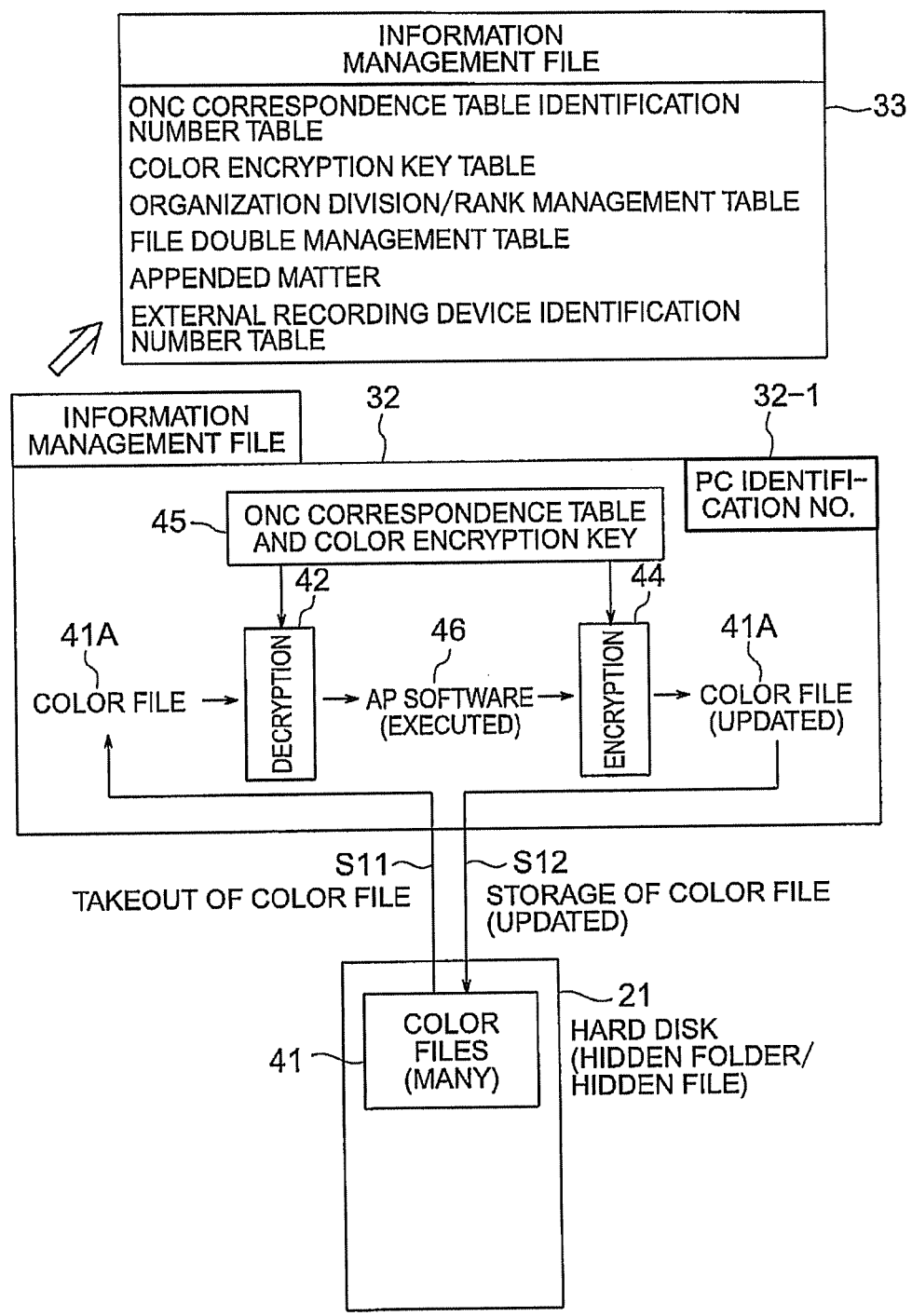
FIG. 5 is a view showing a configuration of regular operational processing for AP software by an information management system.

Further, FIG. 5 shows an example of operation in the case of running an application program (AP software, executable file).

Note that in FIG. 4 and FIG. 5, for convenience of explanation, for the processing generated on the information management system 32 (editing, execution, etc.), a display file 43 and AP software 46 were separately shown, but in the explanation of the present embodiment, both are included in the original file as computer objects. In the explanation from FIG. 11 on, typically the explanation is given for the example of a "display file 43", but in the present invention, the concept of a file includes an ordinary file and an executable file, so in the explanation relating to a "display file", the explanation of an executable file (AP software) is also included.

In the above, the original file may also be a file which is comprised of AP software and documents or other data which was prepared and edited by the AP software. In this case, the document file etc. and the executable file relating to the AP software are combined in the original file. The original file is encrypted to a single color file. Therefore, the above "display file" 43 which is generated by decrypting this color file corresponds to the above original film comprised of the document file etc. and executable file of the AP software combined together.

Note that the content of the above "initial processing" will be explained later with reference to FIG. 17, FIG. 18, and FIG. 29.

In the information management system 32 shown in FIG. 4 and FIG. 5, the PC identification number 32-1 which was assigned to the information management system 32 matches with the PC identification number which was assigned to the computer 10, so legitimate startup and operation are possible.

FIG. 4 will be explained next. In FIG. 4, the internal configuration of the information management file 33, the internal configuration of the information management system 32, and the internal configuration of the hard disk 21 are shown. The internal configuration of the information management system 32 is shown using the content of processing of information management as an example of operation.

Inside the hard disk 21, as one example, a large number (a plurality of) color files 41 are stored. A color file 41, in the case of this embodiment, is a file which was encrypted from an original file using an ONC correspondence table or color encryption key prepared separately in advance or a ONC correspondence table and a color encryption key. The method of encryption and original file will be explained later. Note that the method of encryption is not limited to just one using color.

The method of storage of the color file in the hard disk 21 may be the hidden folder format or the hidden file format. In FIG. 4, the information management system 32 takes out any one color file from the color files which are stored in the hard disk 21, in particular an ordinary document file or other display file. This is edited in the memory 13 on the information management system 32. The state of this operation is shown by configuration and flow of data.

A single color file 41A is taken out from the color files 41 of the hard disk 21 (step S11) and is acquired by the information management system 32. The content of the original file before encryption of this color file 41A is a document file etc.

In the information management system 32, on the memory 13, the acquired color file 41A is converted to the original file, that is, the display file 43, based on the decryption processing by the decrypting means 42. The display file 43 is handled on the memory 13 as in the editing processing. When the target processing ends, the display file 43 is again converted to the color file 41A based on the encryption processing by the encrypting means 44. The encrypted color file 41A is updated in content. After that, the color file 41A is stored in the color file 41 of the hard disk 21 (step S12).

Here, the method of encryption and the original file will be explained.

First, the "original file" will be generally explained. Here, the "original file" means something which is handled on an ordinary computer or through a computer (data, information program, hardware driving file, or broadcast or other media content), that is, a computer object. A "computer object" is "text (document), symbols, graphics, mathematical formulas, images, video (moving pictures), audio, and other individual data, information, programs (executable file, software), a combination of application software and data handled by the same, which are handled inside a computer or through a computer".

Note that a computer object can be handled even in a peripheral device of a computer 10, various related devices, or a computer system comprised of a plurality of computers connected by communication lines.

Next the method of "encryption" will be explained. In the present embodiment, representatively, encryption is performed using color.

In the encryption method utilizing color, color data which is expressed by "color" or "data relating to color" and showing the encrypted content is data for expressing the RGB or CMYK or other color. As explained above, the color data is stored in the hard disk 21 in the form of the color file 41. Below, the "color data" and "color file" are synonymous.

Here, "color" means the hundreds of colors which are handled as data in a computer and can be displayed on the screen of its display. The "color", in principle, is a physical presence recognized by ordinary persons by their visual sense under visible light. If displaying the color on the screen of the display 22 of a computer 10, the color is recognized by the visual sense of a person as a display based on a combination of colors on the screen, that is, an image of a "color code".

Note that the above "color data" is "color digital values". The "color digital values" are numerical values dependent on the attributes of the color and are digital values assigned when handling color as data on a computer.

The computer object (original file) is converted by the encrypting means (converter) 44 to color data (color file). The conversion function of the encrypting means (converter) includes two types of conversion functions of "an information conversion type conversion function" and "an information substitution type conversion function". These two types of conversion functions are selectively used.

If the above color data prepared by the information conversion/information substitution function of the converter 33 (function of information conversion or function of information substitution), that is, the function of "color encryption", is displayed on the screen of the display 22, it is possible to display a specific color code image. Here, a "color code image" is synonymous with "color image". The color data itself forms the above color file 41 on the hard disk 21 of the computer 10.

As explained above, the computer object (original file) is converted by the encrypting means 44 to the color file 41.

In the above, the computer object (original file) and the color file are in a correspondence relationship. Each of the computer objects (original files) is linked with a color file (color data) by the information conversion/information substitution function of the encrypting means 44.

The "information conversion/information substitution" function of the encrypting means 44 is comprised of the "information conversion (conversion)" function in the usual sense and the function of simple "information substitution (substitution)". The information substitution function may also be a replacement function. For the conversion function of the encrypting means 44, whether "information conversion" or "information substitution" is determined by the content of the computer object. For example, byte data document data etc. are processed by information substitution processing, while compressed data of binary data and programs etc. are processed by information conversion processing. However, the byte data may be processed by information conversion processing and information substitution processing, but binary data can only be processed by information conversion. In actuality, "information conversion" and "information substitution" depend on the computer object and are separate matters, but are treated comprehensively as the information conversion/information substitution function of the encrypting means 44.

Further, conversely, if converting the color file 41 by the decrypting means (inverse converter) 42, it is returned to the computer object, that is, the original file.

The encrypting means 44, as explained later, uses the color conversion table which is provided in the information management file 33 (at least one of ONC correspondence table (ON correspondence, NC correspondence, and CO correspondence) or substitution program) or a color conversion key (color encryption key or encryption program) for processing, based on which the function of "information conversion/information substitution" is realized. Note that "color conversion table" also includes, in the broad sense, a "color encryption key".

The above "O" means a computer object, "N" means a color number, and "C" means a color.

Furthermore, the decrypting means 42 similarly uses a color inverse conversion table (ONC correspondence table (at least one of ON correspondence, NC correspondence, and CO correspondence) or substitution program) which is provided in the information management file 33 or uses a color conversion key (color encryption/decryption key) for processing based on which a decryption (inverse conversion) function is realized.

The color inversion conversion table is the above color conversion table used in the reverse direction. In the correspondence table, the conversion origin and conversion destination were merely switched. It can be said to be substantially the same.

If a computer object (original file) is converted by the encrypting means 44 to a color file 41, it is not possible to directly view and learn the content of the original computer object based on the color file 41. When desiring to view the color file 41 as a computer object (original file), it is necessary to use the decrypting means 42 to restore it to the original state. However, this is only on the information management system 32 on the computer 10. In the state stored on the hard disk 21, the file is always in the form of the color file 41. The original file, that is, the computer object, does not exist. Due to this, it is possible to maintain the confidentiality of and protect the data, information, programs, etc. which are stored on the hard disk 21 of the computer 10.

Next, returning again to FIG. 4, the content of the information management file 33 will be explained. The information management file 33 includes, as information, in the case of the present embodiment, at least the "ONC correspondence table identification number table", "color encryption key table", "organization division/rank management table", "file double management table", "appended matter", and "external recording device identification number table". Further, information relating to a plurality of ONC correspondence tables which are listed on the ONC correspondence table identification number table, information relating to the plurality of color encryption keys which are listed on the color encryption key table, etc. are stored in the information management file 33, hard disk 21, etc. Furthermore, as an example of a "color encryption key", in the current file, this may be expressed as a "key image".

In the flow of processing of the information management system 42 shown in FIG. 4, the decrypting means 42 and the encrypting means 44 use "ONC correspondence tables" which are provided from the information management file 33 and a "color encryption key" 45.

Next, FIG. 5 will be explained. In FIG. 5, the information management system 32 processes AP software (executable file, application program). The characterizing point here is the processing for executing a program. The rest of the configuration is the same as the content explained in FIG. 4. Therefore, for the elements which are shown in FIG. 5, elements the same as elements which are explained in FIG. 4 are assigned the same reference notations and explanations will be omitted.

Note that in the constitution of the information management system 32 shown in FIG. 4, when the information management system 32 is not given PC identification number 32-1, the treatment is as follows.

As explained above, the PC identification number 32-1 which is given to the information management system 32 was a condition for permitting legitimate startup at the computer 10. In the information management system 32, when the system executable file does not have the PC identification number 32-1 embedded in it, startup at the computer 10 is not possible.

That is, in the information management system 32, when the PC identification number 32-1 is not embedded, the "ONC correspondence table" and "color encryption key" 45 are not provided from the information management file 33, so the decrypting means 42 and the encrypting means 44 cannot be realized. Therefore, even if taking out a color file 41A from the hard disk 21 (step S11), for example, it is not possible to generate processes such as subsequent editing of the display file 43, updating of the color file 41A, and storage of the updated color file 41A (step S12).

The content of the information management file 33, that is, the file constitution etc. are shown in FIG. 6. The functions of the information management system 33, as described in FIG. 6, at least the four functions of "execution of encryption/decryption", "file management", "file operation restriction", and "file information takeout prohibition".

The above encrypting means 44 and decrypting means 42 are realized by the function of "encryption/decryption". In the function of "encryption/decryption", the file is configured by the "ONC correspondence table identification number table", "organization division table", and "organization rank table".

The substantive file of the ONC correspondence table identification number table is the "ONC correspondence table". The ONC correspondence table, as explained above, is a color conversion table, ONC correspondence table (at least one of ON correspondence, NC correspondence, and CO correspondence) or substitution program. Further, the ONC correspondence table includes, in the broad sense, a color conversion key (color encryption key or encryption program) in concept. Furthermore, the "ONC correspondence table" includes content of inverse conversion for decryption.

Further the substantive file of the "organization division table" is a "division-wise ONC correspondence table", while the substantive file of the "organization rank table" is a "rank-wise ONC correspondence table". One example of the "division-wise OCN correspondence table" in the "organization division table" is shown in FIG. 9. According to this organization division table, the "ONC correspondence table identification number" and "color file identification number list" are shown in accordance with the different levels of the organization divisions. Further one example of the "rank-wise ONC correspondence table" in the "organization rank table" is shown in FIG. 8. According to this organization rank table, the "ONC correspondence table identification number" and the "color file identification number list" are shown in accordance with the rank.

In the tables shown in FIG. 8 and FIG. 9, the contents described in the column of the "ONC correspondence table identification number" are able to be operation in the ONC correspondence table, while the contents shown in the column of the "color file identification number list" are able to be operated in the color file (read, stored, deleted, copied, moved, etc.)

In the table which is shown in FIG. 6, a "summary of security" is described in accordance with the contents of the information management file configuration.

In the table shown in FIG. 6, in the function of "file management", the file is configured by a "file name double management table" and an "appended matter file". The "substantive file" includes a "color file" and "original file".

The substantive file in the "file name double management table" is a "color file". One example of the "file name double management table" is shown in FIG. 7. According to this table, the original files 1 to n are linked with color file ID1 to IDn in the column of the "color file identification number" and are linked with the storage folder names of the color files in the column of "storage folder name (path)". The color files ID1 to IDn may be operated in the color file.

Further, in the "summary of security", "file input/storage rejected" is described. This is sometimes for the purpose of controlling or limiting the input of original files other than color files and controlling permission/rejection in the case of a very important file or file requiring hardware management. This means limitation of the original files which can be input to or stored in the system. In other words, appended matter is added to the original file, the content of the appended matter includes requirements for input/storage of files, and permission/rejection of processing in the system is judged based on whether a file is provided with management matter/processing requirements complying with the appended matter.

In the "file operation restriction" function, the file is configured by "appended matter (file operation)". The substantive files are the "original file", "color file", and "display file".

The relationship between the information management file 32 etc. and the "appended matter" will be explained later with reference to FIG. 11 to FIG. 17.

Note that in the "summary of security" of the "file operation restriction", when trying to input or store a file in the system from outside, permission/rejection of input/storage in the system is judged only for files provided with certain conditions so as to thereby enable control of input or storage. This is for the purpose of rejecting the malicious input/storage of files in the system.

In the "file information takeout prohibition" function, the file is configured by an "external recording device identification number". An external recording device of an identification number (serial number) which is not registered at the information management system 32 is rejected at the computer 10.

FIG. 10A to FIG. 10C show examples of ONC correspondence tables (or ONC correspondence tables).

FIG. 10A shows a table relating to an object-color correspondence table (OC correspondence table) and an object-color editor. The left columns in the table shown in FIG. 10A show the column "object-color correspondence table preparation" in which the correspondence between objects ($O_i(i=1$ to $n)$) and color ($C_i(i=1$ to $n)$) is shown. The objects $O_i$ are generated based on manual or automatic object division. The number (n) is for example a maximum of 65,536. The colors $C_i$ are assigned to the color partial space (RGB). The number (n) is for example a maximum of 65,536. Further, the right columns of the table shown in FIG. 10A show the "object-color editor" column in which the setting changes 1 to m are shown. For the rule for setting changes in the object color editor, for example, a random number, circulatory shift, etc. are used.

FIG. 10B shows a table relating to an object-color number correspondence table (ON correspondence table) and object-color number editor. The left columns of the table shown in FIG. 10B show an "object-color number correspondence table preparation" column where the correspondence between objects ($O_i(i=1$ to $n)$) and color number ($N:1$ to $n$) is shown. The maximum value of the color number N is 65,536. Further, the right columns in the table shown in FIG. 10B show the "object-color number editor" column in which the setting changes 1 to m are shown.

FIG. 10C shows a table relating to the color-color number correspondence table (CN correspondence table) and color-color number editor. The left columns of the table shown in FIG. 10C show the "color-color number correspondence table preparation" column where the correspondence between the colors ($C_i(i=1$ to $n)$) and color number ($N:1$ to $n$) is shown. Further, the right columns of the table shown in FIG. 10C show the "color-color number editor" column where the setting changes 1 to m are shown.

Figure 11:
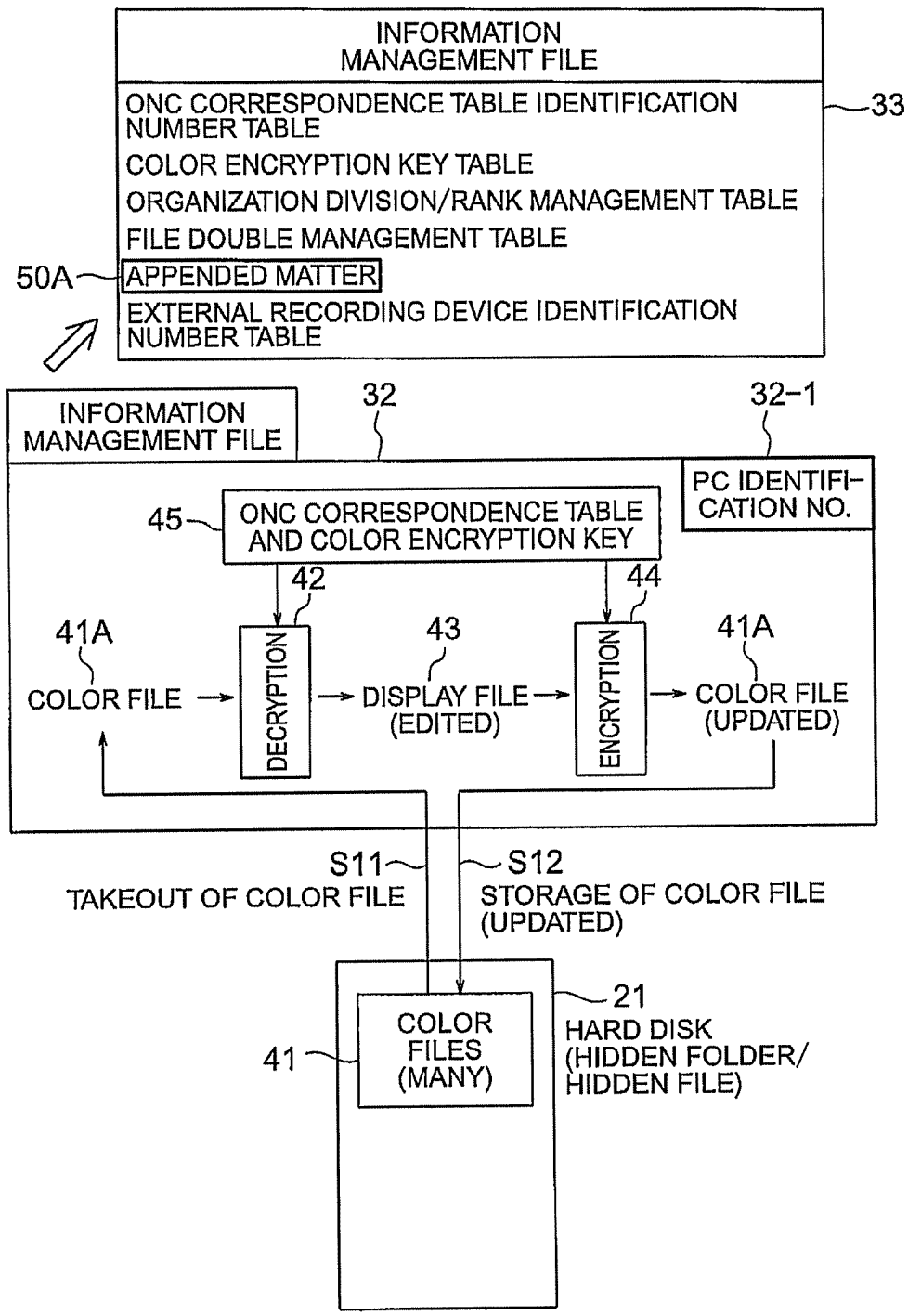
FIG. 11 is a view of the configuration showing appended matter which is added to an information management file in an information management system.
Figure 12:
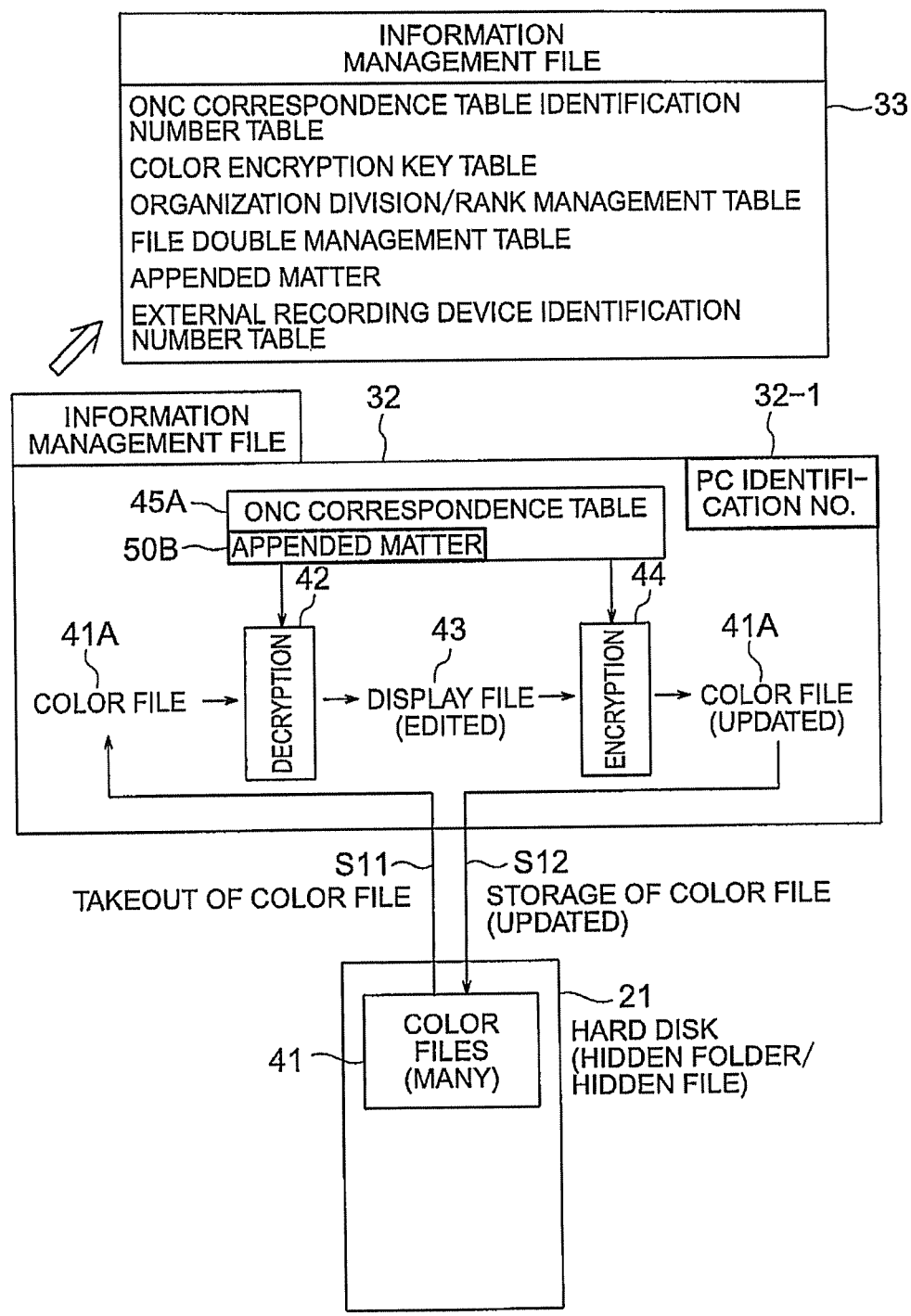
FIG. 12 is a view of the configuration showing appended matter which is added to an ONG correspondence table in an information management system.
Figure 13:
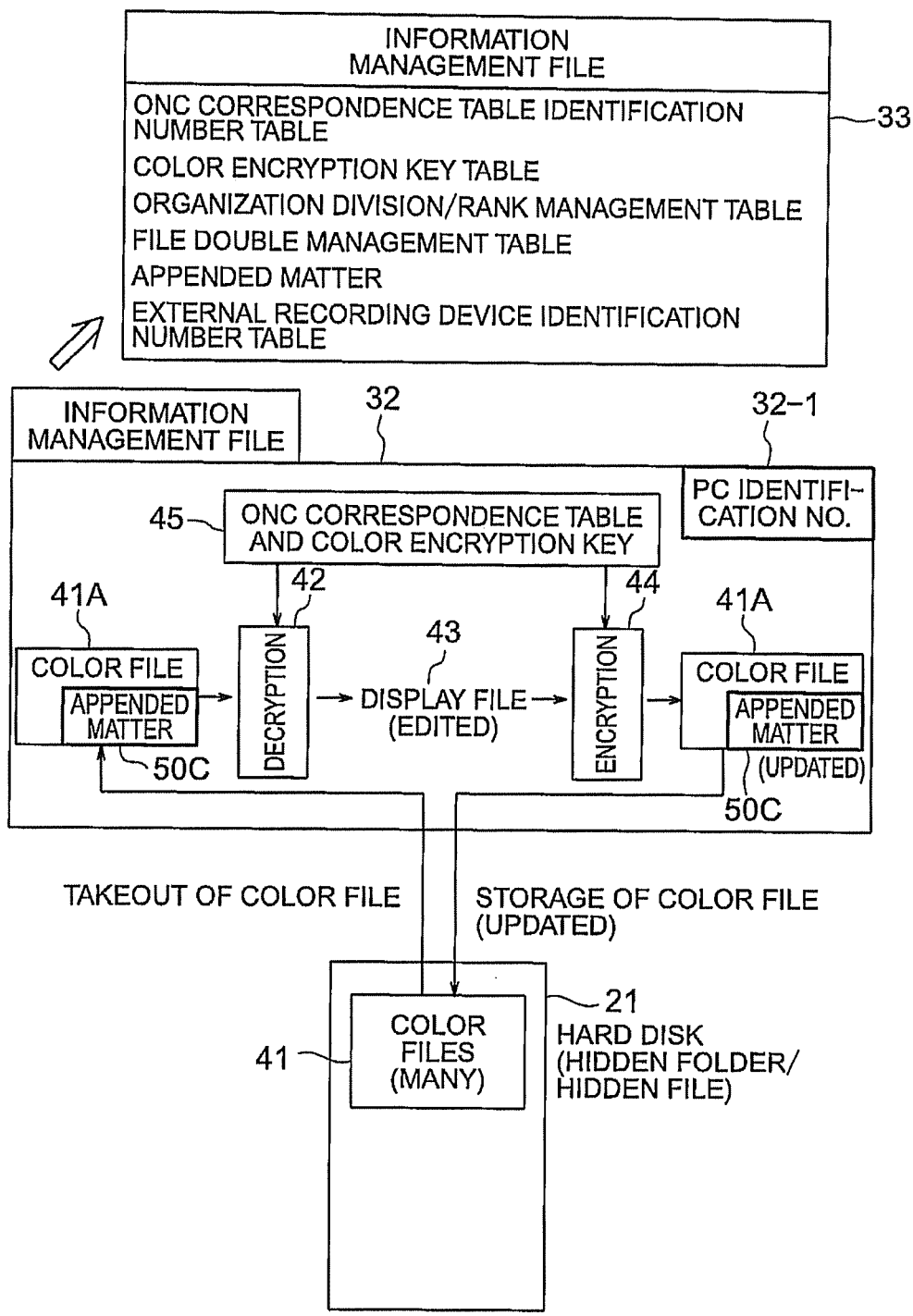
FIG. 13 is a view of the configuration showing appended matter which is added to a color file in an information management system.

Next, referring to FIG. 11 to FIG. 16, the above-mentioned "appended matter" will be explained. The block configuration shown in FIG. 11 to FIG. 13 is basically the same as the block configuration shown in FIG. 4. Elements the same as the elements shown in FIG. 4 are assigned the same reference notations and detailed explanations are omitted. In the processing of FIG. 11 to FIG. 13, when taking out the color file 41A and converting it to a display file 43 for editing on the memory 13 by the information management system 32, the editing is performed while designating any of the content included in the above "appended matter".

Note that in editing of the appended matter, configuration is also possible to as to include only a display function and not an editing function.

FIG. 11 shows the constitution of adding appended matter 50A to the information management file 33. An example of the content of the appended matter 50A which is added to the information management file 33 will be shown in FIG. 14 in a table format. In the table which is shown in FIG. 14, the category of the appended matter 50A is "information leakage (security, change, destruction". In the table, the topmost row describes "appended conditions", "conditional execution control", "coverage", and "examples" as items. The content is described for each of the fields described in the "attached conditions" column, that is, the "comparison of PC identification numbers", "permission/rejection of preparation", "permission/rejection of deletion", "permission/rejection of movement (copying)", "permission/rejection of transfer", "permission/rejection of change", "permission/rejection of copying", "permission/rejection of transfer", and "permission/rejection of printing". In the "permission/rejection of change", when "no", editing is not allowed.

Further the "conditional execution control" of the "permission/rejection of preparation" includes "prepare" and "reject". Further, the "coverage" includes a "color file" and "original file". The "examples" includes "reject original file in initialization processing of file".

FIG. 12 shows the constitution of adding the appended matter 50B to the ONC correspondence table 45A. An example of the content of the appended matter 50B which is added to the ONC correspondence table 45A is shown in FIG. 15 by a table format. In the table shown in FIG. 15, the category of the appended matter 50B is the same "information leakage (security, change, destruction)". The table describes at the topmost row the "appended conditions", "conditional execution control", "coverage", and "examples". The content is described for each of the fields described in the "attached conditions" column, that is, the "comparison of PC identification numbers and comparison of appended matters (constant conditions)", "permission/rejection of movement", "permission/rejection of removal", "permission/rejection of copying", "permission/rejection of transfer", and "permission/rejection of printing".

In the content of "comparison of PC identification numbers and comparison of appended matter (constant conditions)", the "conditional execution control" includes "decrypt" and "reject", the "coverage" includes "color file" and "original file", and, furthermore, the "examples" includes "reject files not meeting conditions".

In a configuration adding appended matter to the above ONC correspondence table, preferably the color numbers in the ONC correspondence table are formed as records, in the color number record field, functions corresponding to the appended matter are assigned, and in the record field having a function, appended matter is provided.

FIG. 13 shows the constitution of adding appended matter 50c to the color file 41A. An example of the content of the appended matter 50c which is added to the color file 41A is shown in FIG. 16 in a table format. In the table which is shown in FIG. 16, the categories of the appended matter 50C are "information leakage (security/change/destruction", "delivery", "illegitimate file", "download", "illegal copy", "download". In the table, the topmost row describes the fields "appended conditions", "conditional execution control", "coverage", and "examples". The content is described for each field in accordance with the contents described in the categories.

Note that the content of descriptions shown as appended matter, the appended conditions, etc. are suitably changed for realization of the categories.

Further, the appended matter 50C does not restrict the content of the appended matter and can be set based on need in accordance with the display file etc.

The appended conditions of the above appended matter are configured to be able to be freely set in content in accordance with the purpose of the file. Further, the control based on the appended conditions of the appended matter is configured to be performed automatically or manually. Note that when performing this manually, the display 22 of the computer 10 displays to the operator a message instructing manual operation. The operator performs the necessary manual operations based on the instruction message.

Next the content of the operation which is executed by the above hardware configuration (computer 10 etc.), various types of functional means (information management system 32, encrypting means 44, decrypting means 42, etc.) and files (information management file 33, color file 41, etc.) will be explained in detail.

Figure 18:
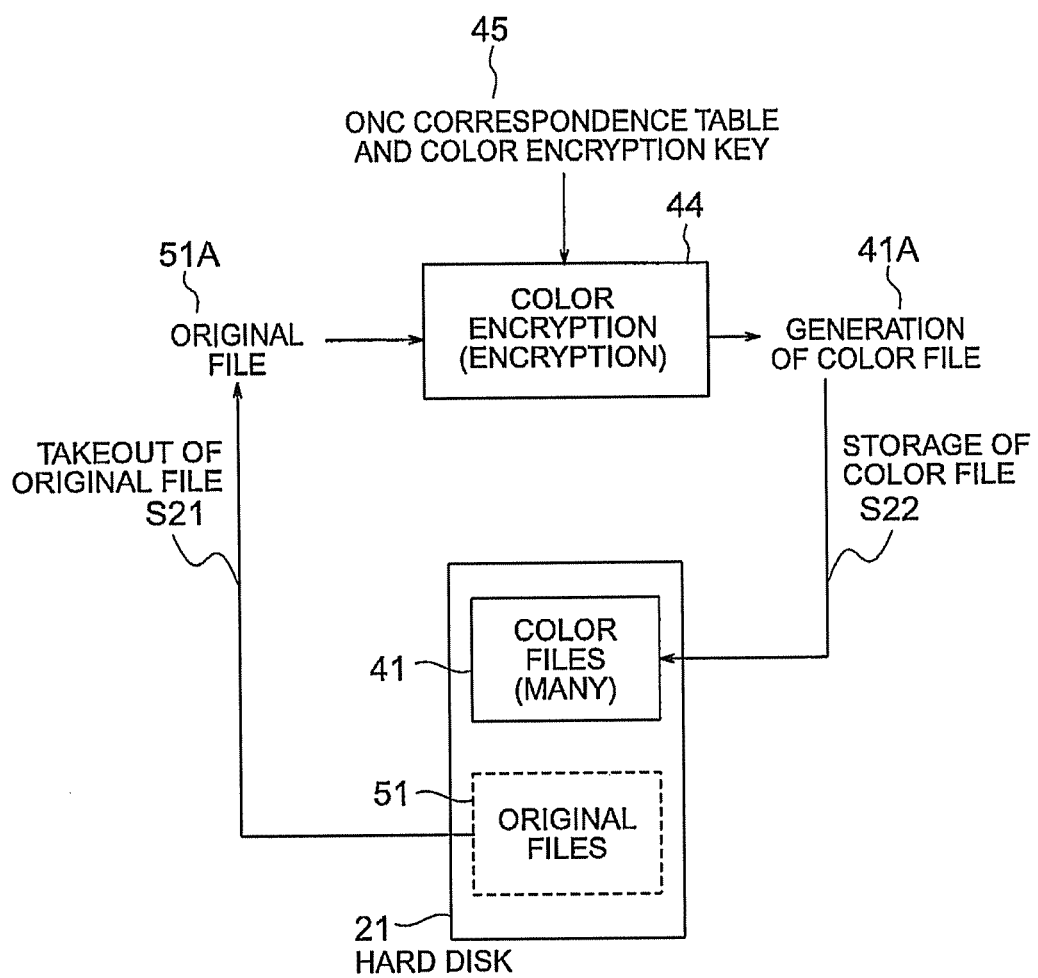
FIG. 18 is a view showing the flow of files in an example of operation for initial processing.
Figure 29:
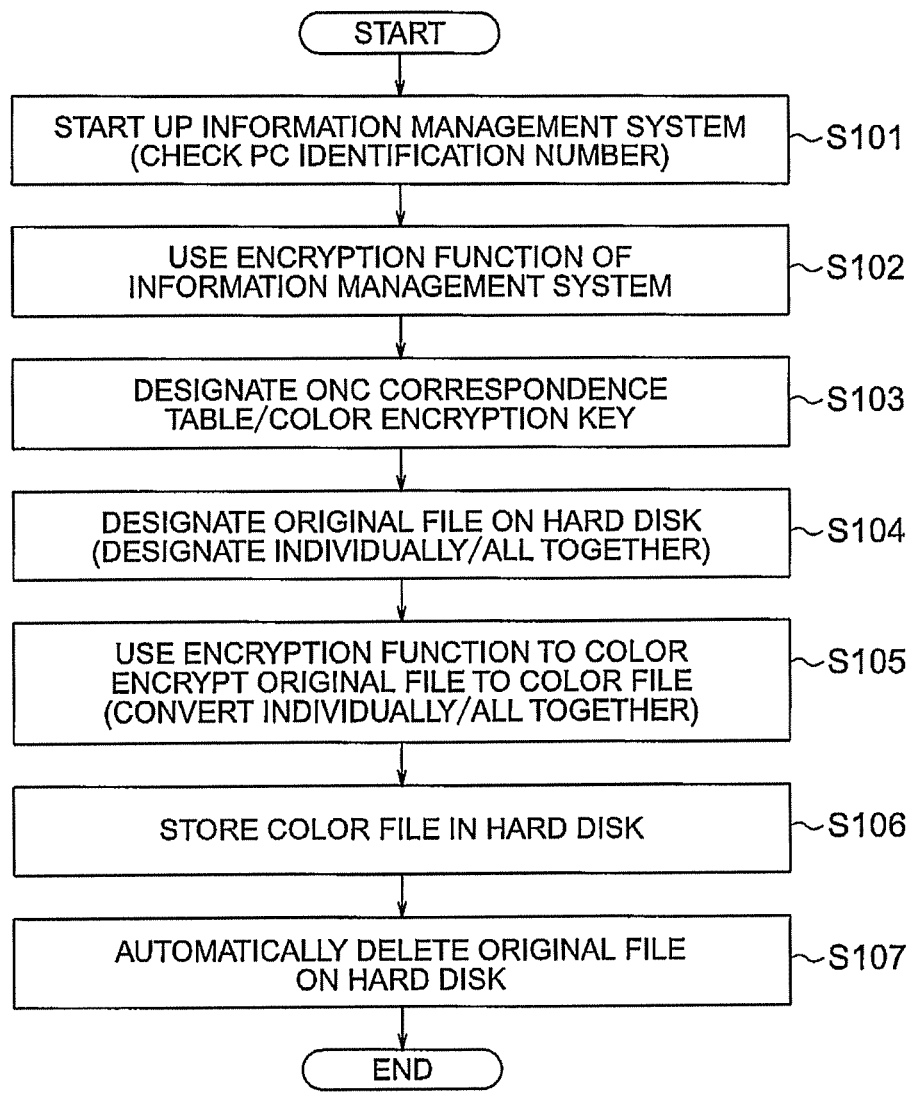
FIG. 29 is a flowchart showing an operation for initial processing.

Referring to FIG. 17, FIG. 18, and FIG. 29, the content of the operation in initial processing in encryption which utilizes color of an original file which utilizes color (computer object) (color encryption) will be explained. FIG. 17 shows the flow of data and flow of processing in the hardware configuration, FIG. 18 in particular shows the flow of file (data), and FIG. 29 is a flowchart of the initial processing.

The operation will be explained in accordance with the flowchart shown in FIG. 29. First, the hard disk 21 of the computer 10 usually has a large number (or plurality) of original files 51 stored in it.

At step S101, the information management system 32 is started up on the computer 10. At that time, the PC identification number is checked. When matching, startup and operation are permitted. The CPU 12 executes the information management system-use program whereby the information management system 32 is constructed on the memory 13.

At the next step S102, based on the content of the information management file 33, the encryption function of the information management system 32 (encrypting means 44) is used. As a result, in the memory 13, an encrypting means 44 (in FIG. 17 and FIG. 18, shown as means for "color encryption") is realized.

At step S103, based on the content of the information management file 33, the ONC correspondence table/color encryption key 45 is designated. This "ONC correspondence table/color encryption key 45" can be called a "key image". The "key image", that is, the "ONC correspondence table/color encryption key 45", corresponds to a so-called "password" and is an element having the role of a unique password in the present invention.

At the next step S104, the original file to be encrypted is designated from the original file 51 which is stored in the hard disk 21. The designated original file 51A is taken out from the hard disk 21 (step S21 of FIG. 17 and FIG. 18). Note that original files may be designated and taken out individually or all together.

At step S105, the original file 51A which was taken out is processed by the encryption function, that is, the color encrypting means 44, for substitution or conversion to the color file 41A. In the color encryption processing at the color encrypting means, the ONC correspondence table and/or color encryption key 45 is used.

At the next step S106, the generated color file 41A is stored in the hard disk 21 (step S22). In this way, a large number of storage regions for color files 41 are formed.

At the final step S107, the original file 41A from which the color file 51A was generated as explained above is automatically deleted from the hard disk 21.

According to the above initial processing, after the initial processing, when all of the large number of original files 51 become color files 41 due to the color encryption (color encrypting means 44), all of the original files 51 disappear. In the hard disk 21 or other storage memory, the original files 51 are automatically deleted and disappear, so original files cannot be taken outside. Further in subsequent updating of content or other processing, inside the computer 10, only encrypted secure color files 41 are circulated forming a closed loop, so leakage of data etc. can be reliably prevented.

In the above configuration, regarding the original files 51 which were encrypted to color files 41 by the initial processing, after the initial processing, preferably all of the original files 51 are automatically deleted from the hard disk 21, but if necessary, it is also possible to configure the system so as to leave part or all of the original files 51. In this case, the data storage memory, that is, the hard disk 21, holds the original files 51 and the encrypted color files 41 corresponding to those original files after the initial processing, that is, the two sets of files coexist. This means that the system can be designed in any way.

Furthermore, only naturally, in the data storage memory, that is, the hard disk 21, the original files 51 before the initial processing and the color files 41 after the initial processing can be made to coexist. The original files 51 themselves are successively generated by ordinary functions and operations of the computer 10, so it is usual for color files 41 for which initial processing has finished and original files 51 in a state before initial processing to coexist on the hard disk 21 of a computer 10.

Furthermore, when storing an original file 51 on the hard disk 21 of a computer through a USB memory 31A or other external recording device 31 etc. and the original file 51 has a virus or other file embedded in it, this is removed by cleaning. That is, all of the files embedded inside the original file 51 other than the file encrypting software of the present invention are removed by cleaning at the time of the encryption in the initial processing.

Regarding the method of the above cleaning processing, setting removal/deletion markers, "setting of deletion" at the appended matter explained at FIG. 16, and "permission/rejection of deletion" in the appended conditions explained in FIG. 14 have been studied from the viewpoint of protection of the control program. All programs (executable files) other than the file encryption software according to the present invention are configured to be deleted. For this reason, a function is provided for enabling the input and output of only the file encryption software according to the present invention and deleting other programs. Further, by removing virus software aimed at external leakage from a computer, the leakage of information is blocked.

Figure 19:
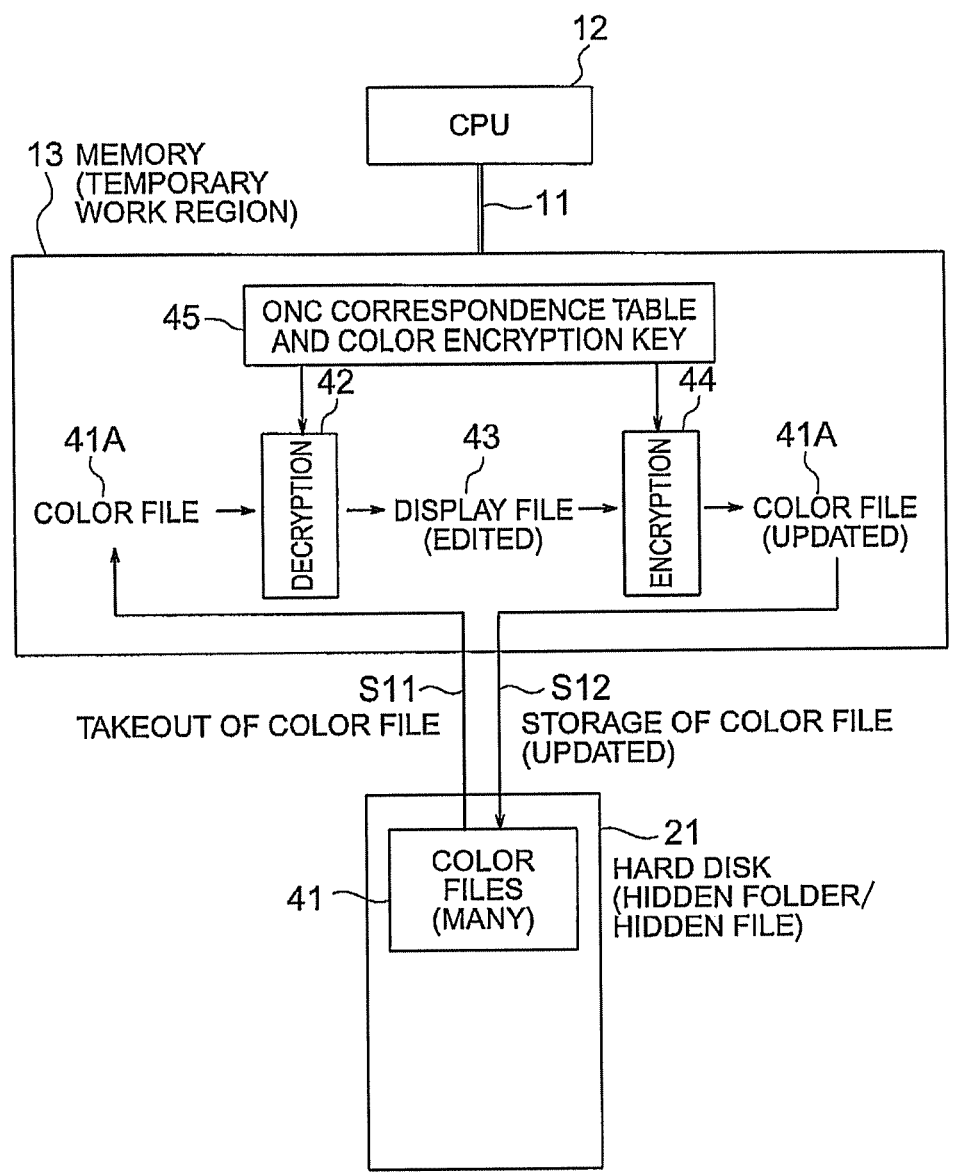
FIG. 19 is a view of the configuration for explaining an example of operation for regular operational processing.
Figure 20:
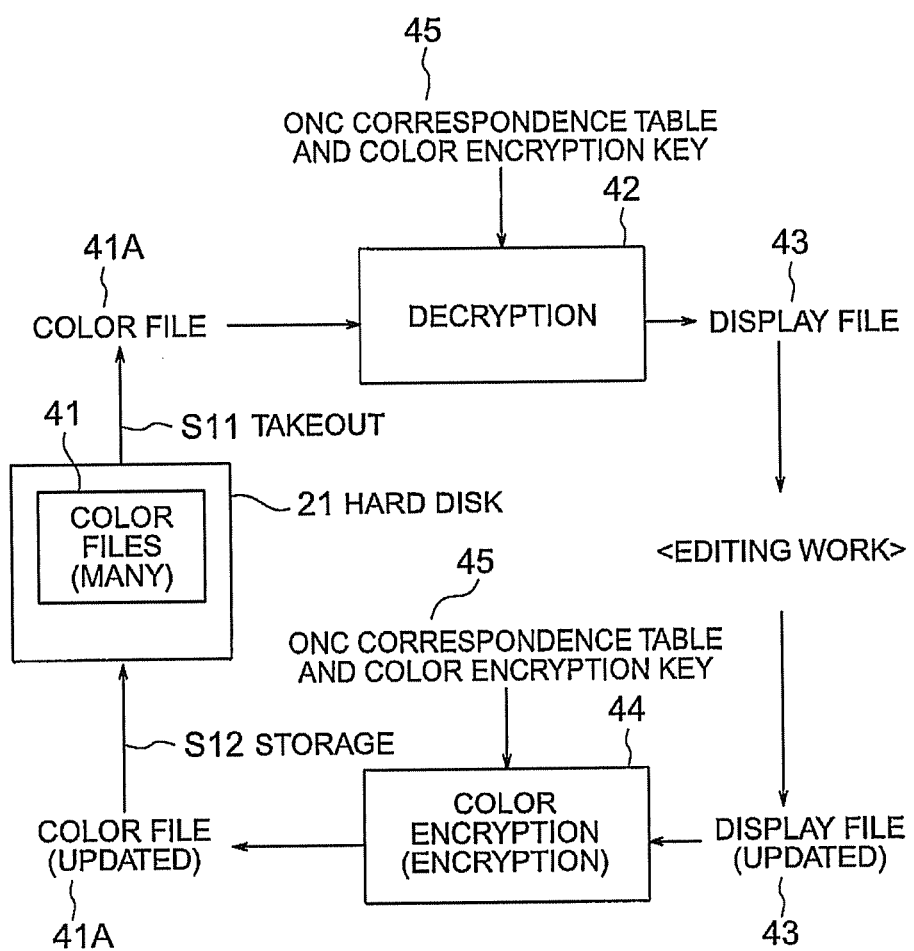
FIG. 20 is a view showing a flow of files in regular operational processing.
Figure 30:
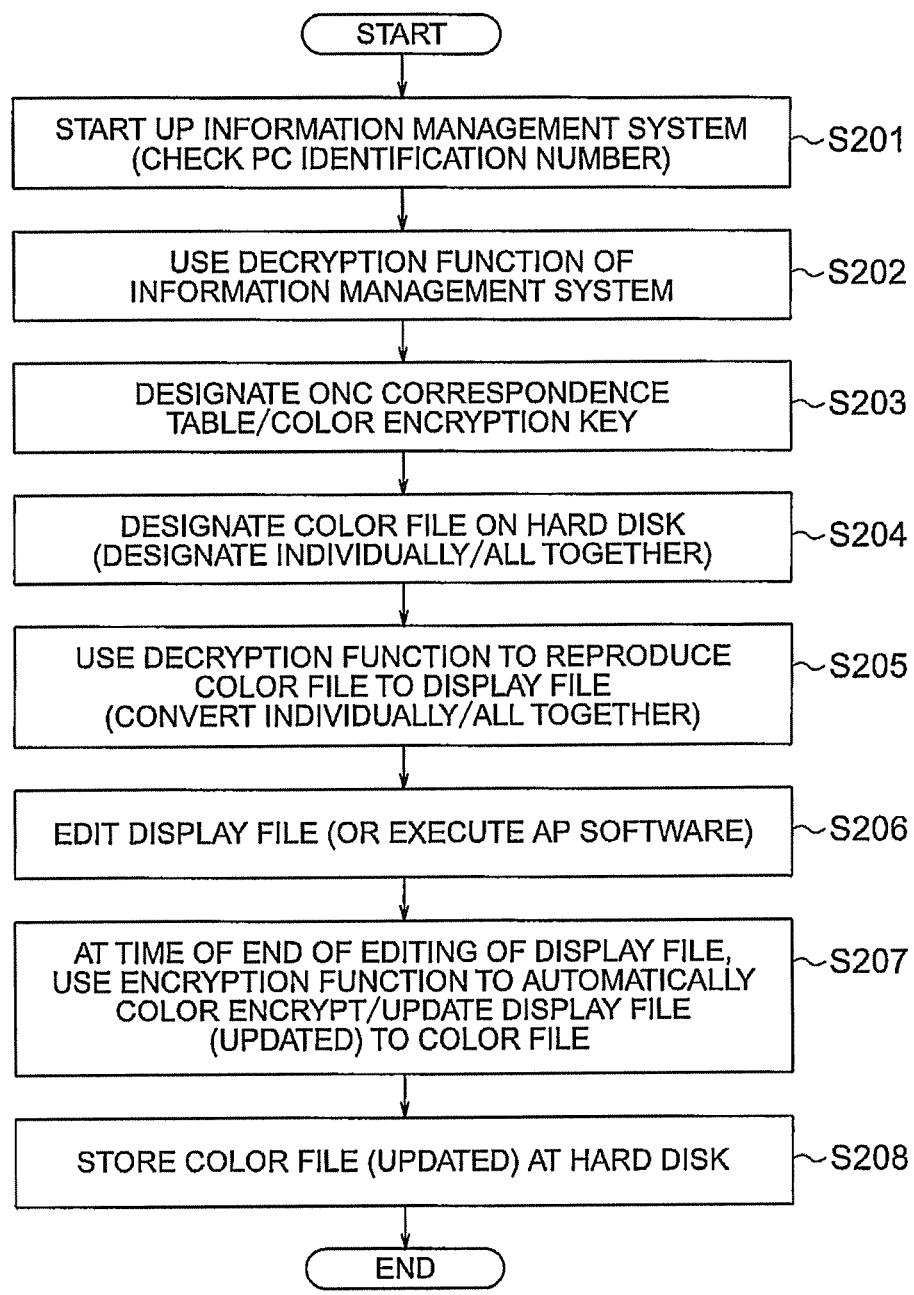
FIG. 30 is a flowchart showing an operation of regular operational processing.

Next, referring to FIG. 19, FIG. 20, and FIG. 30, the content of operation of regular operational processing for updating the content of a color file 41 will be explained. FIG. 19 shows the flow of data and the flow of processing on a hardware configuration, FIG. 20 shows in particular the flow of files (data), and FIG. 30 shows a flowchart of operational processing.

The operation will be explained in accordance with the flowchart shown in FIG. 30. This is after initial processing, so the hard disk 21 of the computer 10 stores only a large number (or plurality) of color files 41.

The constitution shown in FIG. 19 is substantially the same as the constitution which is shown in FIG. 4, so elements the same as elements shown in FIG. 4 are assigned the same reference notations.

At step S201, the information management system 32 is started up on the computer 10. At that time, the PC identification number is checked. If matching, startup and operation are permitted. By the CPU 12 executing the information management system-use program, an information management system 32 is constructed on the memory 13.

Note that when the PC identification numbers match at the time of checking the PC identification numbers, the above-mentioned cleaning processing is executed in advance so that virus software is not launched.

At the next step S202, the decryption function (decrypting means 42) of the information management system 32 is used based on the content of the information management file 33. As a result, the decrypting means 42 is realized in the memory 13.

At step S203, based on the content of the information management file 33, the ONC correspondence table/color encryption key 45 is designated.

At the next step S204, the color file 41A to be updated is designated from the color files 41 stored in the hard disk 21. The designated color file 41A is taken out from the hard disk 21 (step S11 at FIG. 19 and FIG. 20). Note that color files may be designated and taken out individually or all at once.

At step S205, the taken out color file 41A is processed by the decryption function, that is, the decrypting means 42, for substitution or conversion to the display file 43. In the decryption processing at the decrypting means 42, the ONC correspondence table and/or color encryption key 45 is used.

At step S206, the editing work of the display file 43 is performed and the content of the display file 43 is updated. Note that in this example, the example of a display file 43 was explained, but the same is true even for AP software.

At the next step S207, the display file 43 which was updated in the editing work is encrypted by the encrypting means 44 to a color file 41A.

Furthermore, at step S208, the color file 41A is stored in the hard disk 21 (step S12).

In the above, the computer object is stored in the hard disk 21 in the form of a color file 41. When updating the content, the information management system 32 handles the object as a display file 43 and performs editing work on only the memory 13. At this time, what is edited is only the display file 43 and not the original file. The "display file" means a file whose content is displayed on the display 22 and which can be edited using a keyboard 23 etc.

As shown in FIG. 6, in the editing work, preparation, change, and deletion are possible, but as shown in FIG. 14, if change is not permitted in the permission/rejection of change of the appended conditions of the information management file, change of the file by editing is not permitted. It is possible to access an access point which is shown in the display file and display the link fields, but the system is configured so that a display file (for example homepage etc.) cannot be changed by a third party (the homepage cannot be maliciously tampered with or altered).

According to the operation of the above-mentioned regular operational processing, the display file 43 is present in only the primary work region, that is, the memory 13, and cannot exist at all other storage regions or recording regions. The display file 43 is a volatile file on the memory 13. Further, the system is set up so that in operations on the display file 43, for "storage", the original file is automatically deleted at all times. Further the system is set up so that for "print/transfer", a stop mode is set which is released by input of a password.

Further, the printer can stop use or enable printing of the decrypted content by addition of the device identification number or appended matter. Due to this, the functions of the printer are limitatively used. In the appended conditions of the appended matter, for example, at the time of "permission/rejection of printing" under the printing conditions, printed output of the display file which is decrypted from the color file is rejected. Further, at the time of "printing permitted" under the printing conditions, printed output of the display file is permitted. Further, the printing conditions may include the printed range, number of copies, vertical/horizontal printing, etc.

Further, even if storing the content which was stored in the hard disk 21 in a USB memory 31A etc., walking around with it, and losing the USB memory 31A etc. for some reason or another, third parties cannot decode it without the OC correspondence table, so the content is extremely secure.

A modification of the flowchart showing the content of operation of the regular operational processing which is shown in FIG. 30 will be explained with reference to FIG. 31A and FIG. 31B. The flowchart of FIG. 31A and the flowchart of FIG. 31B together show a single flowchart divided into two.

Figure 31A:
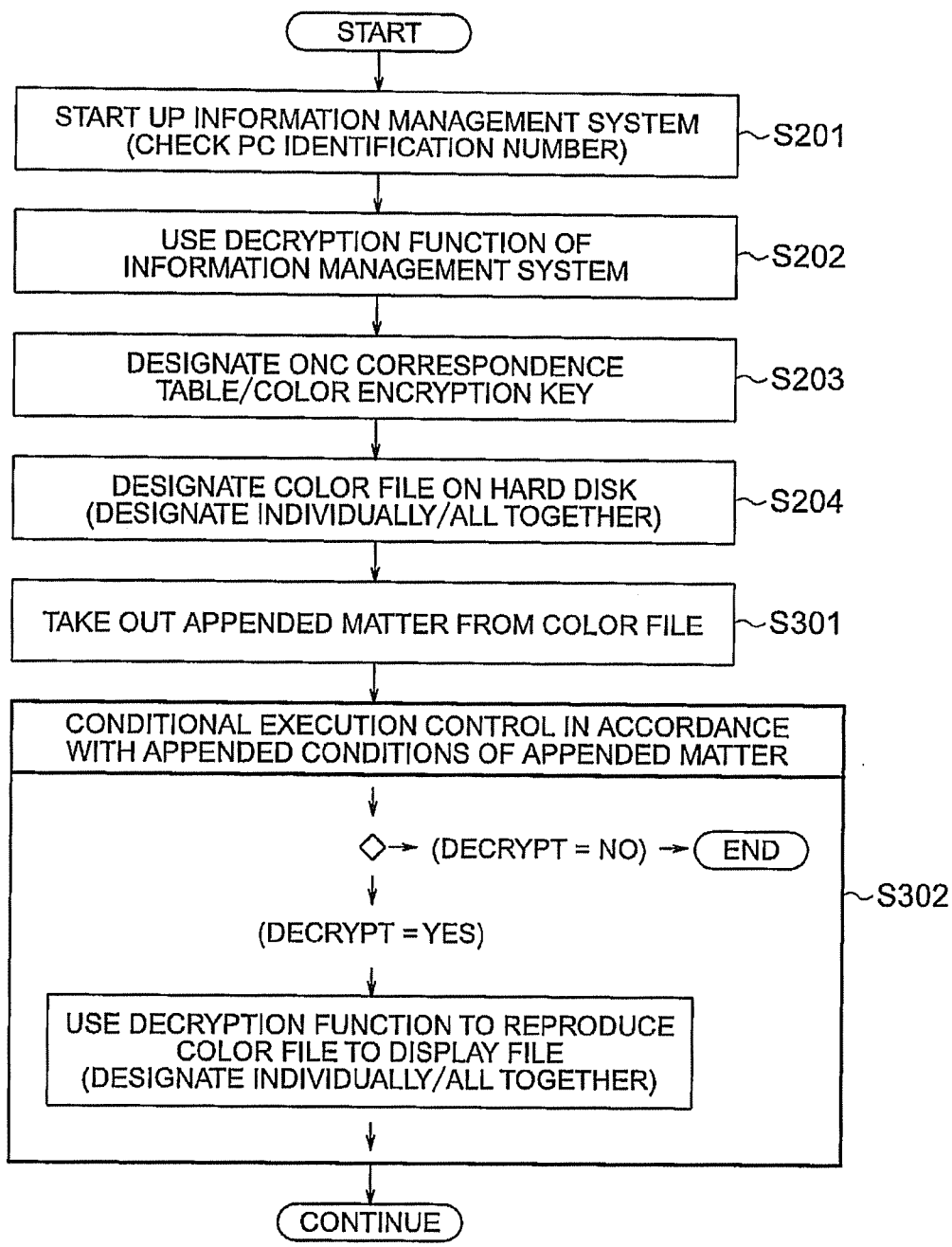
FIG. 31A is a flowchart showing a first half of an operation of regular operational processing based on appended matter/conditional execution control.
Figure 31B:
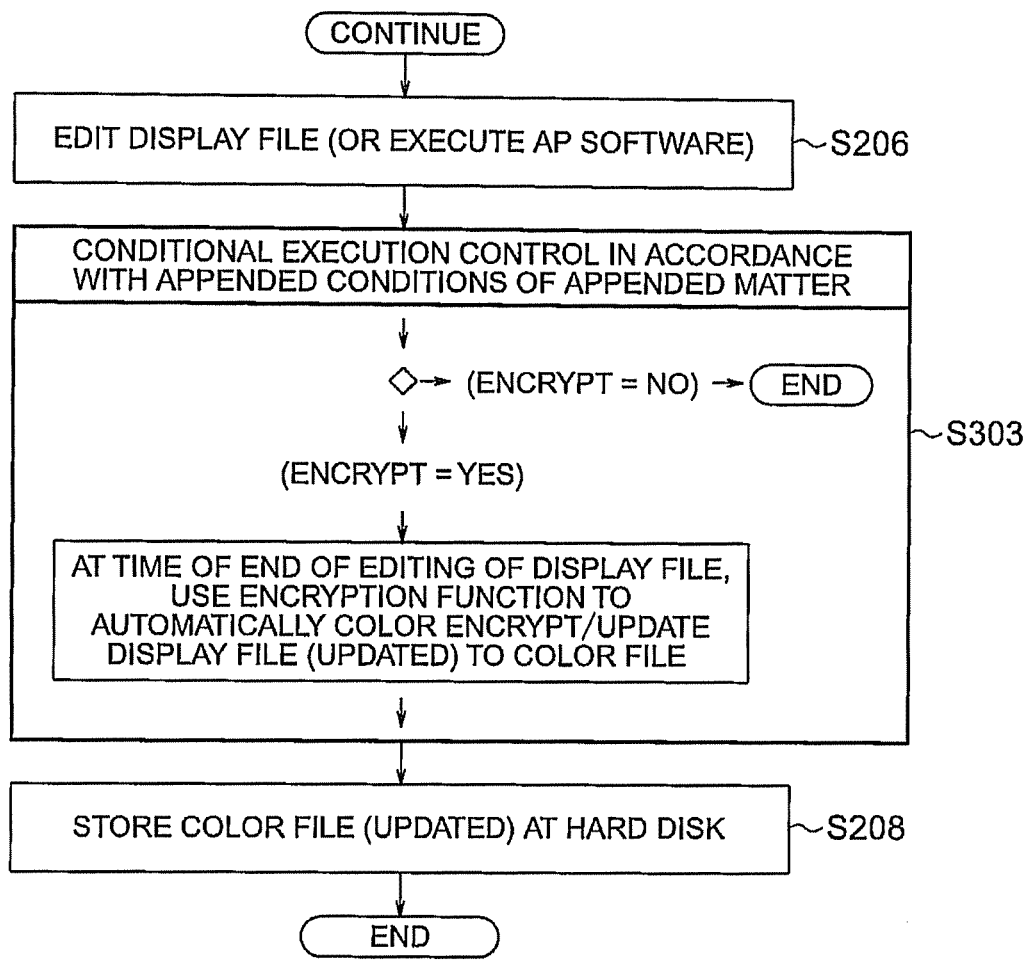
FIG. 31B is a flowchart showing a second half of an operation of regular operational processing based on appended matter/conditional execution control.

The flowcharts shown in FIG. 31A and FIG. 31B show the content of the operation of the regular operational processing in the case using the appended matters prepared in the information management file 33. In the flowcharts shown in FIG. 31A and FIG. 31B, steps the same as the steps which were explained in the flowchart of FIG. 30 are assigned the same reference notations and explanations are omitted. In this case, steps S201, S202, S203, S204, S206, and S208 are the same.

After step S204, step S301 is executed. At this step S301, the "appended matter" which is assigned to the color file is taken out from the designated color file.

At the next step S302, conditional execution control is performed in accordance with the appended conditions of the "appended matter" which was taken out. The specific content of step 302 is, for example, to end the decryption when NO and to execute the decryption function, take out the designated color file, and restore the display file when YES.

After step S206 relating to the editing of the display file etc., step S303 is executed. At step S303, conditional execution control is performed in accordance with the appended conditions of the "appended matter" which was taken out. The specific content of step 303 is, for example, to end the encryption when NO and to execute the encryption function and encode the edited display file by the encryption function to a color file when YES.

Finally, the color file which was changed in content is stored again in the hard disk 21 (step S208).

Figure 21:
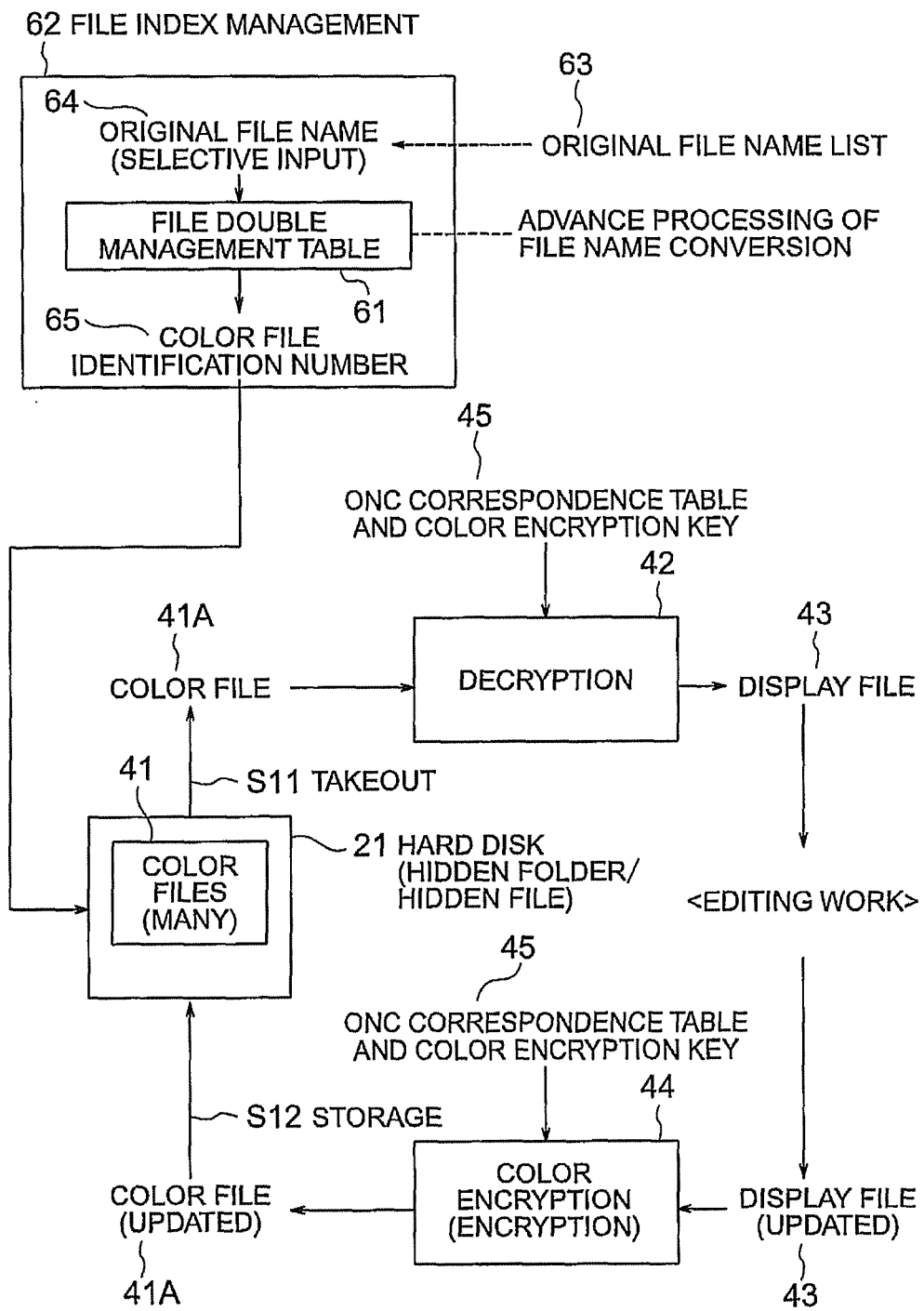
FIG. 21 is a view showing a flow of files in regular operational processing utilizing a file double management table.
Figure 32A:
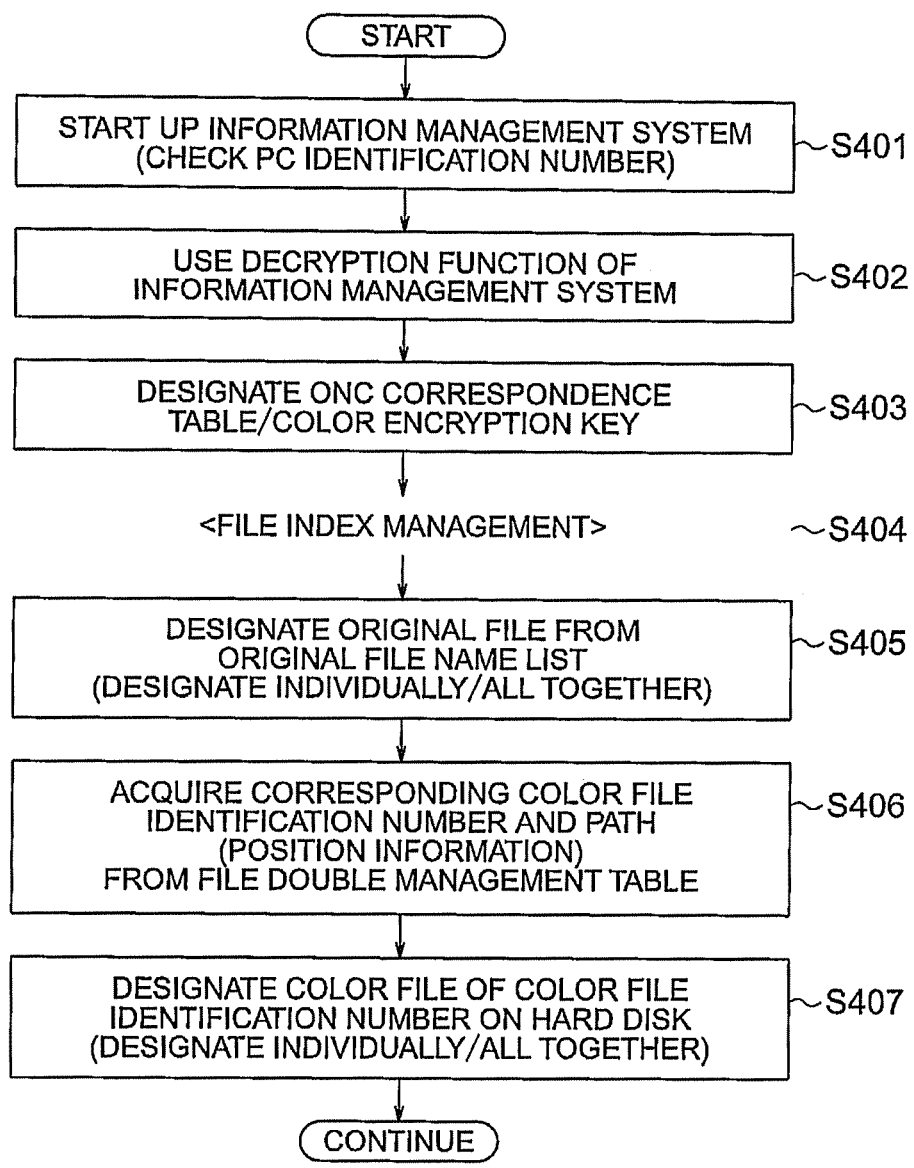
FIG. 32A is a flowchart showing a first half of an operation of regular operational processing utilizing file double management.
Figure 32B:
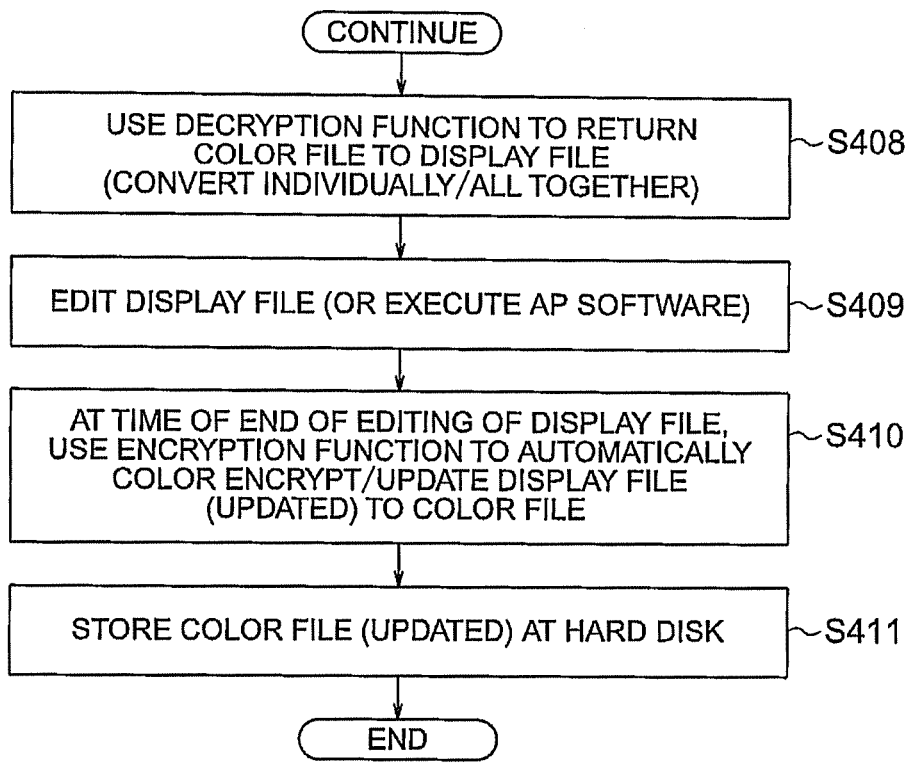
FIG. 32B is a flowchart showing a second half of an operation of regular operational processing utilizing file double management.

Next, referring to FIG. 21 to FIG. 28, FIG. 32A, and FIG. 32B, the content of the operation in regular operational processing for updating the content of a color file 41 for the case of using a file double management table, organizational division/rank management table, etc. prepared in the information management file 33 will be explained. FIG. 21 shows the flow of files (data), while FIG. 32A and FIG. 32B are flowcharts of the operational processing. The flowchart of the FIG. 32A and the flowchart of FIG. 32B together show a single flowchart divided into two.

In FIG. 21, any color file 41A which requires updating of content is taken out from the color files 41 which are stored in the hard disk 41, is decryped by the decrypting means 42 to a display file 43 etc. (sometimes AP software 44), and is changed in content by editing work. The updated display file 43 etc. is color encrypted by the encrypting means 44 and again stored in the hard disk 21. The flow of processing is the same as the content explained with reference to FIG. 19 and FIG. 20. In this embodiment, in the above flow of processing, as shown in FIG. 21, file double management is performed based on the file index management 62 utilizing the file double management table 61.

The operation will be explained in accordance with the flowcharts shown in FIG. 32A and FIG. 32B. This is after initial processing, so the hard disk 21 of the computer 10 is in a state storing only a large number of (or a plurality of) color files 41.

Due to this step S401, on the computer 10, the information management system 32 is started up. At this time, the PC identification number is checked and, when matching this, startup and operation are permitted. By the CPU 12 executing the information management system-use program, the information management system 32 is constructed on the memory 13.

At the next step S402, based on the content of the information management file 33, the decryption function of the information management system 32 (decrypting means 42) is used. As a result, the decrypting means 42 is realized in the memory 13.

At step S403, based on the information management file 33, an ONC correspondence table/color encryption key 45 is designated.

At the next step S404, "file index management" is performed. The functional part of this "file index management" is shown by the block 62 in FIG. 21.

At step S405, the original file name 64 is designated from the original file name list 63. This original file name is selectively input. The original files 64 are designated individually or all together.

At the next step S406, based on the file double management table 61, the corresponding color file identification number 65 and path (position information) are obtained from this.

At the next step 407, the obtained color file identification number 65 is used to designate the color file corresponding to the color file identification number. In the operation of regular operational processing for updating content which is circulating, when taking out a color file 41A for updating, a color file having the above color file identification number is taken out (step S11 in FIG. 21). Note that the color files 41A may be designated and taken out individually or all together.

At step S408, the taken out color file 41A is processed by the decryption function, that is, the decrypting means 42, for substitution or conversion to a display file 43 for restoration. In the decryption processing at the decrypting means 42, an ONC correspondence table and/or color encryption key 45 is used.

At step S409, the editing work of the display file 43 is performed and the content of the display file 43 is updated. Note that in this example, the example of a display file 43 was explained, but the same is true for AP software as well.

At the next step S410, the display file 43 which was updated at the editing work is encrypted by the encrypting means 44 to the color file 41A.

Furthermore, at step S411, the color file 41A is stored in the hard disk 21 (step S12).

Figure 22:
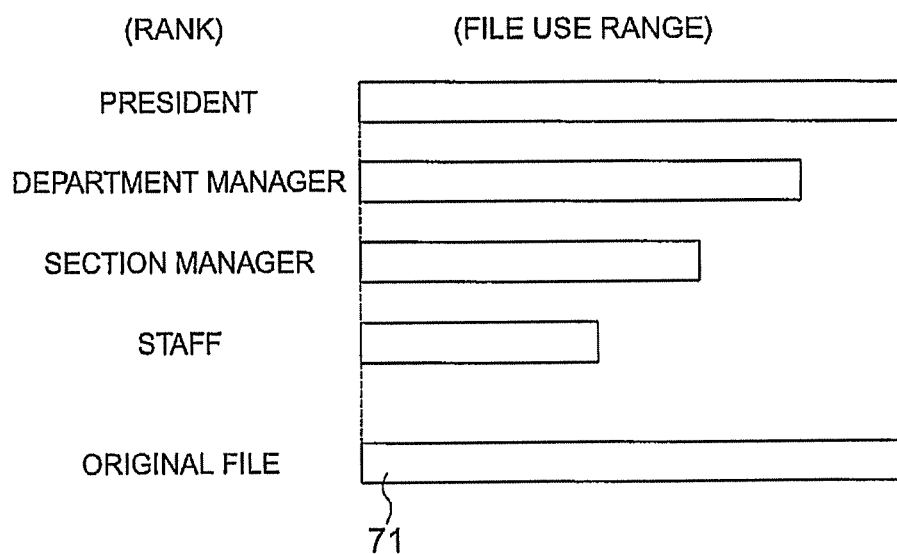
FIG. 22 is a view for explaining the restriction on the range which may be utilized by rank.
Figure 23:
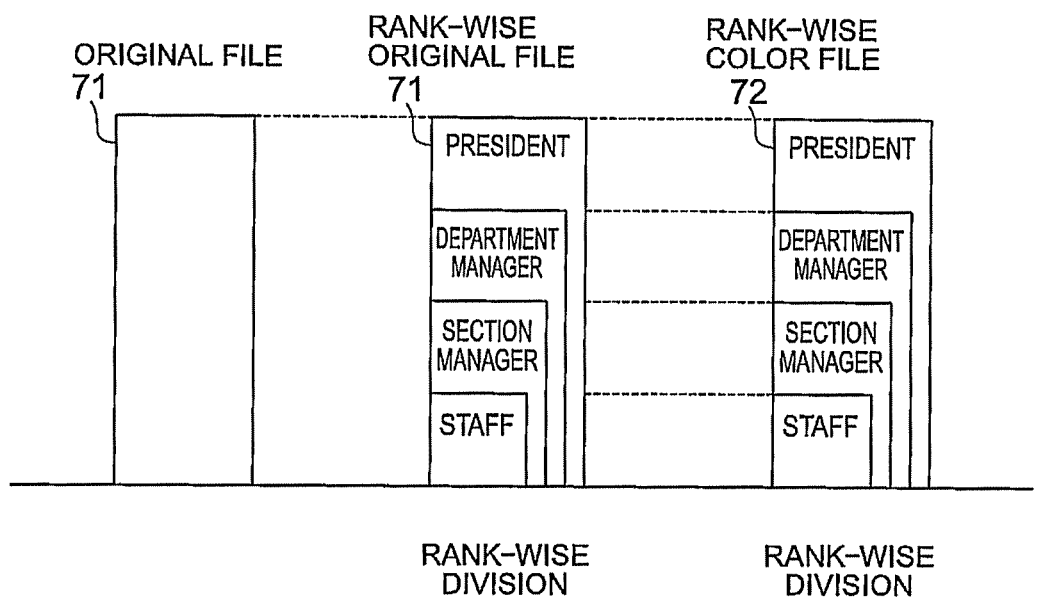
FIG. 23 is a view for explaining the configuration of a file ranking.
Figure 24:
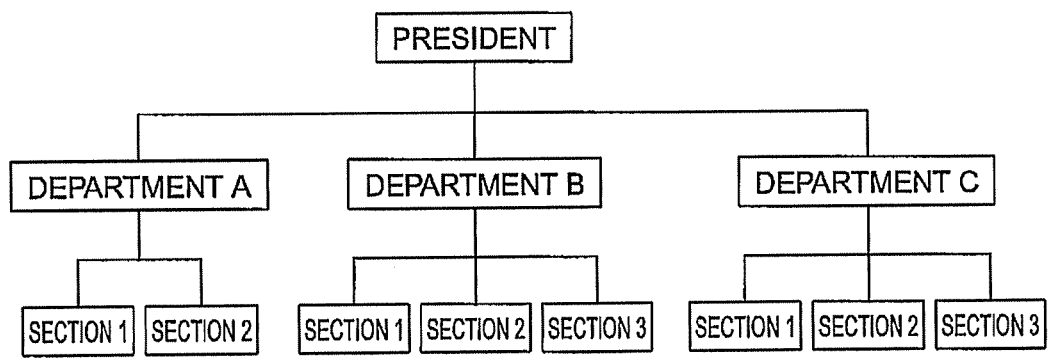
FIG. 24 is a view for explaining an example of an organization division table.

FIG. 22 to FIG. 24 show, as the configuration of the information management file 33 of the information management system 32, one example of the content of the organizational division/rank management table which is explained in FIG. 6 etc.

FIG. 22 shows restriction of the range of use by rank. As members forming an organization, there are the ranks of president, department managers, section managers, and staff. Respective ranges of file use are relatively determined in accordance with ranks based on the original file 71 as a whole. Note that the pyramid configuration of the organization divisions of a company etc. is shown in FIG. 24. The president is positioned at the top, the department managers are the heads of the "departments" and the section managers are the heads of the "sections". The staff are members belonging to the "sections". Due to this, the positional relationship between the organization divisions and ranks of the members forming the organization as a whole becomes clear.

Further, as shown in FIG. 23, in the correspondence between the original files 71 and color files 72, ranges of use of content are determined for each rank in accordance with rank at each of the original files 71 and color files 72.

Figure 25:
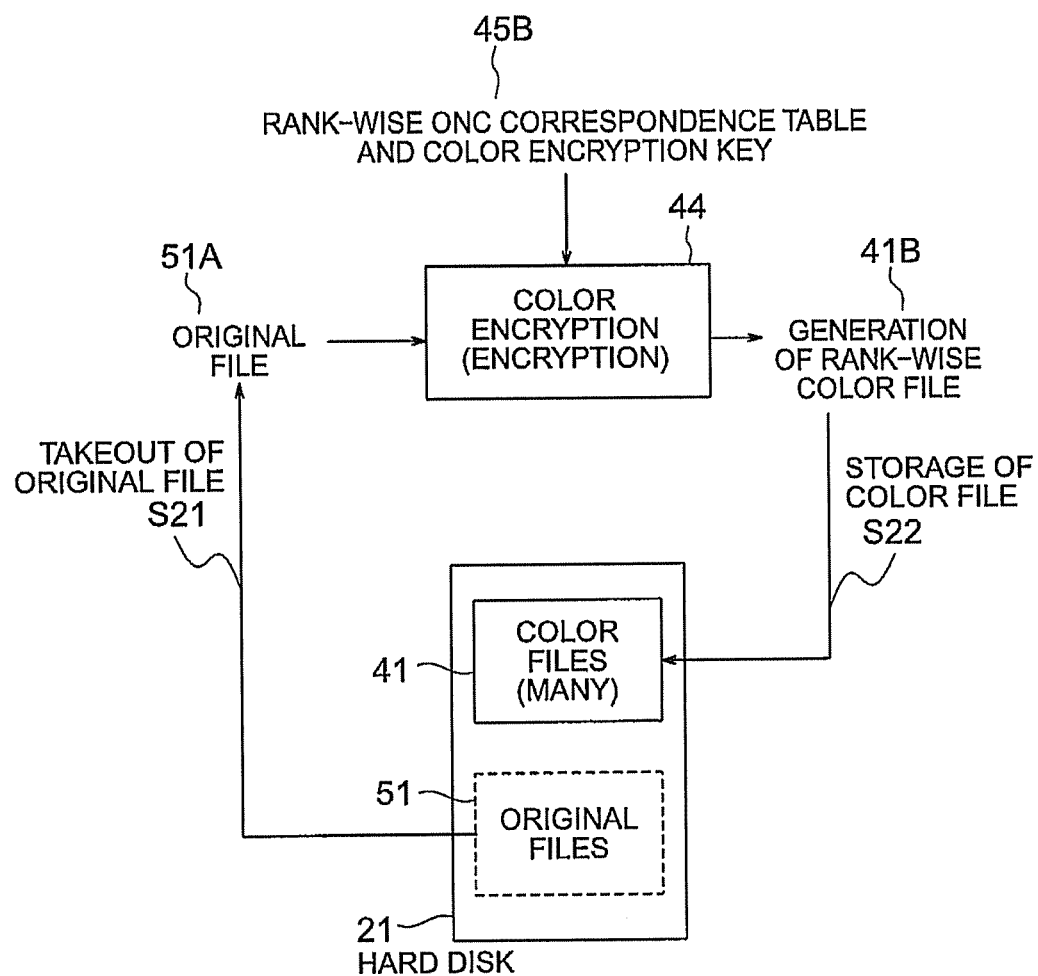
FIG. 25 is a view showing the flow of files utilizing a rank-wise ONC correspondence table etc. for initial processing.

FIG. 25 shows an example of the operation in initial processing for encrypting (color encrypting) an original file to a color file and shows rank-wise initial processing. The basic component parts are the same in content as explained in FIG. 17 and FIG. 18. In FIG. 25, elements the same as the elements shown in FIG. 18 are assigned the same reference notations and explanations are omitted.

The characterizing configuration of FIG. 25 is that, instead of the "ONC correspondence table and color encryption key" 45, a "rank-wise ONC correspondence table and color encryption key" 45B are used. As a result, a rank-wise color file 413 is prepared. This initial processing reflects the rank-wise file configuration shown in FIG. 23.

Figure 26:
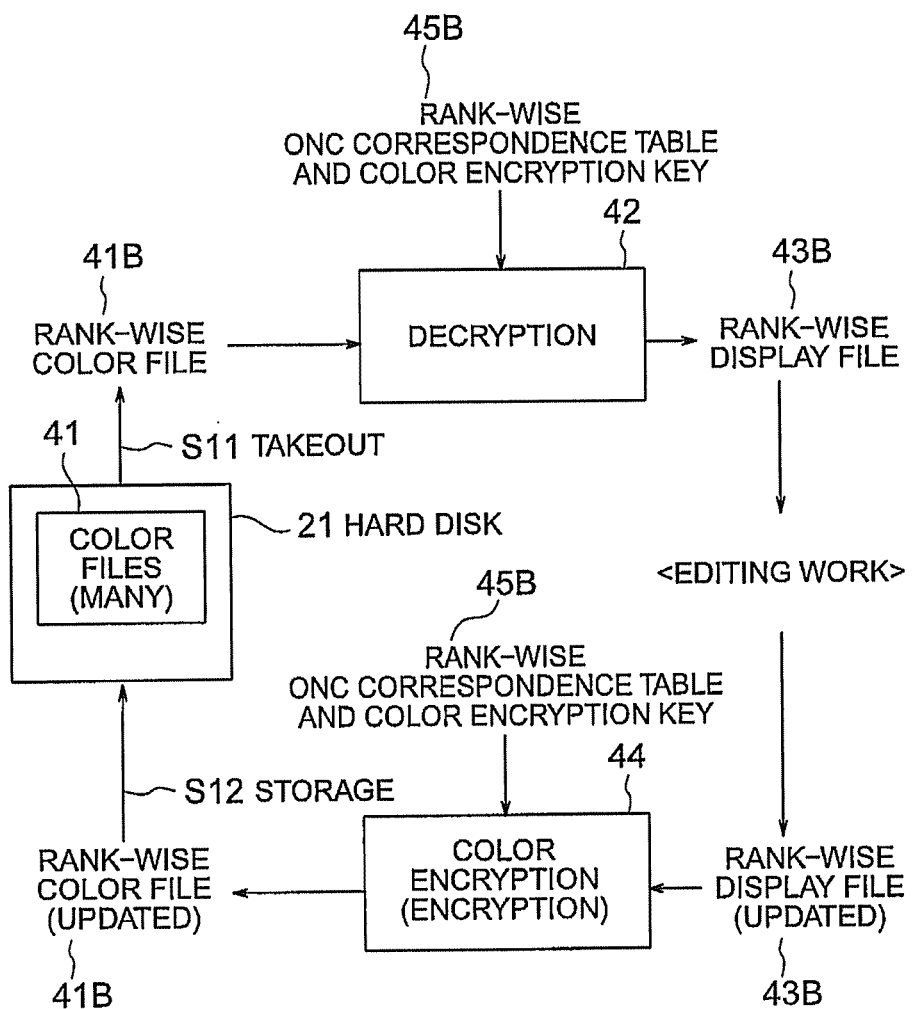
FIG. 26 is a view showing the flow of files for regular operational processing utilizing a rank-wise ONC correspondence table etc.

FIG. 26 shows an example of operation in regular operational processing for updating the content of an encrypted color file and shows an example of operation by rank. The basic component parts are the same in content as explained in FIG. 17 and FIG. 18. In FIG. 26, elements the same as the elements shown in FIG. 20 are assigned the same reference notations and explanations are omitted.

The characterizing configurations of FIG. 26 are that what is updated is a rank-wise color file 413 and that instead of the "ONC correspondence table and color encryption key" 45, a "rank-wise ONC correspondence table and color encryption key" 45B is used. As a result, a rank-wise display file 43B is prepared. This regular operational processing reflects the rank-wise file configuration shown in FIG. 23.

Figure 27:
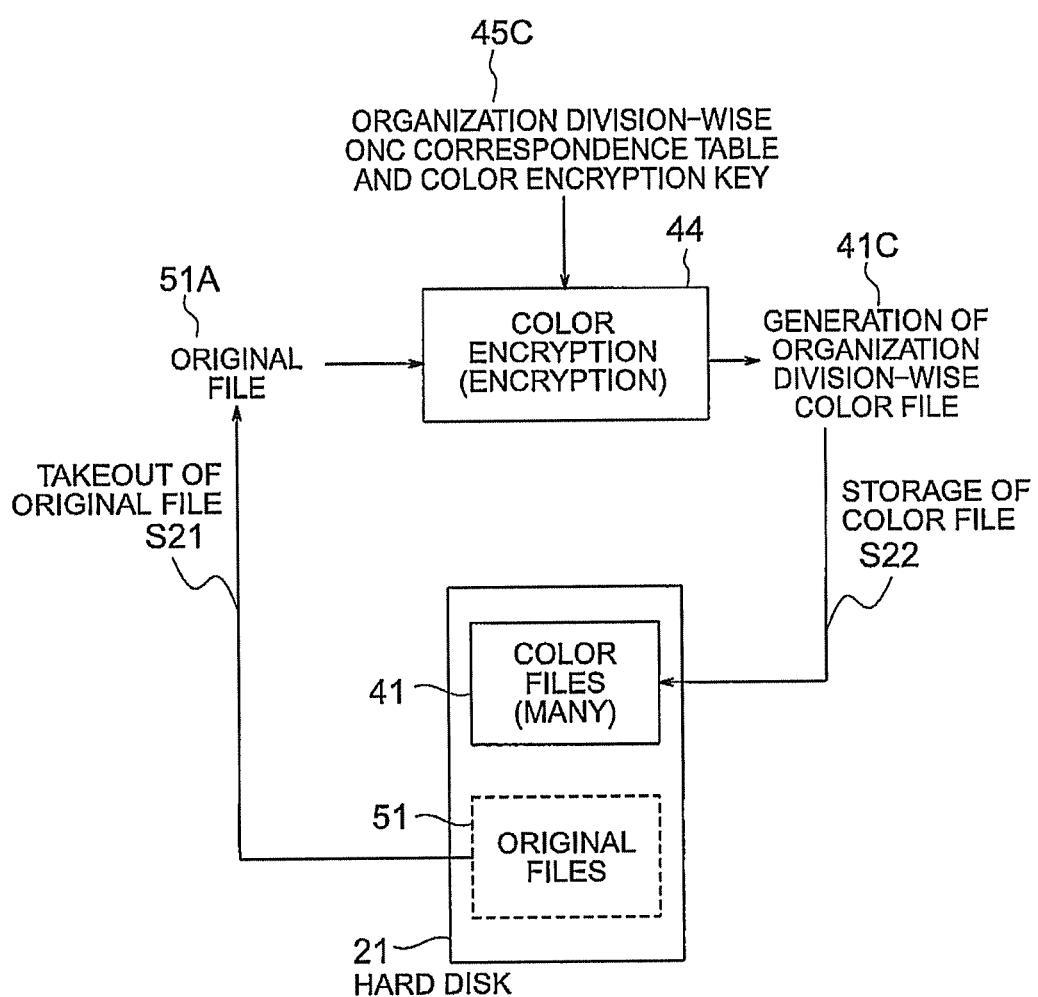
FIG. 27 is a view showing the flow of files for initial processing utilizing an organization division-wise ONC correspondence table etc.

FIG. 27 shows an example of the operation in initial processing for encrypting (color encrypting) the original file to a color file and shows an example of operation in organization division-wise initial processing. The basic component parts are the same in content as explained in FIG. 19 and FIG. 20. In FIG. 27, elements the same as the elements shown in FIG. 20 are assigned the same reference notations and explanations are omitted.

The characterizing configuration of FIG. 27 is that instead of an "ONC correspondence table and color encryption key" 45, an "organization division-wise ONC correspondence table and color encryption key" 45C are used. As a result, an organization division-wise color file 41C is prepared. This initial processing reflects the organization division-wise file configuration shown in FIG. 24.

Figure 28:
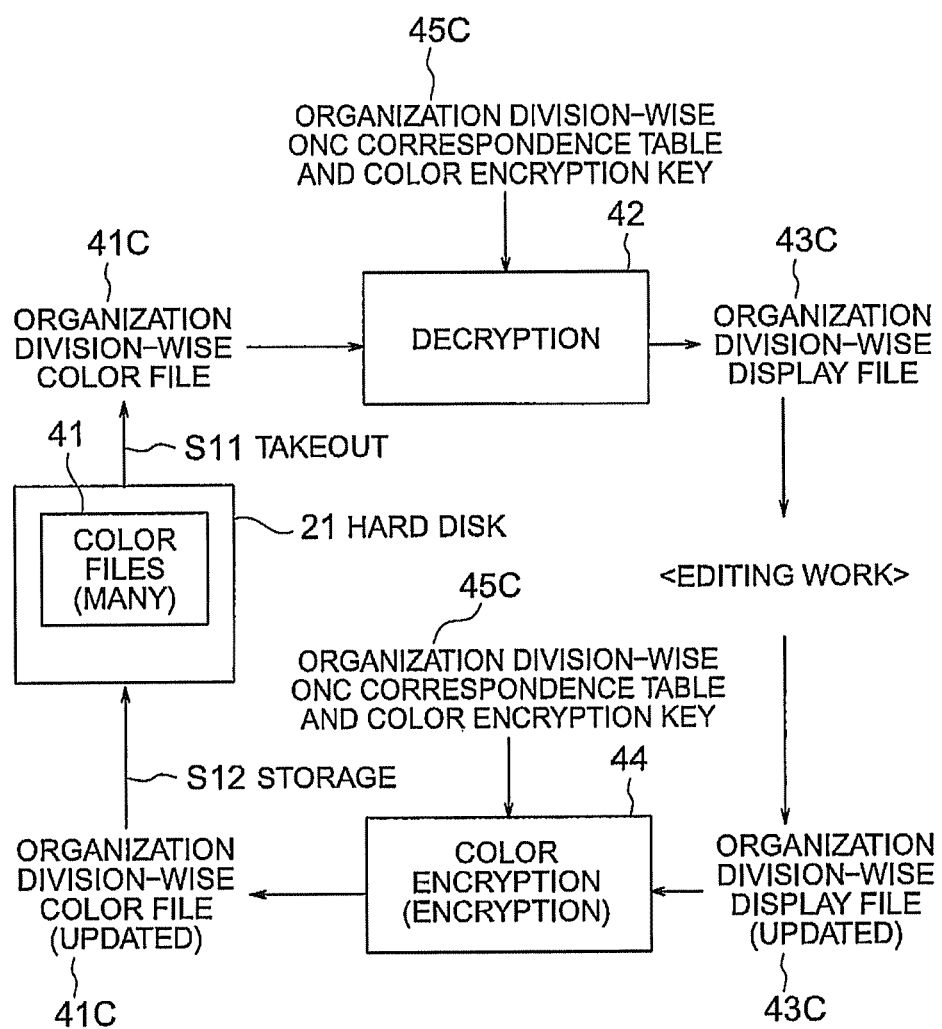
FIG. 28 is a view showing the flow of files for regular operational processing utilizing an organization division-wise ONC correspondence table etc.

FIG. 28 shows an example of the operation in regular operational processing for updating an encrypted color file and shows an example of organization division-wise operation. The basic component parts are the same in content as explained in FIG. 19 and FIG. 20. In FIG. 28, elements the same as the elements shown in FIG. 20 are assigned the same reference notations and explanations are omitted.

The characterizing configurations of FIG. 28 are that what is updated is the organization division-wise color file 41C and that, instead of the "ONC correspondence table and color encryption key" 45, an "organization division-wise ONC correspondence table and color encryption key" 45C are used. As a result, an organization division-wise display file 43C is prepared. This regular operational processing reflects the organization division-wise file configuration shown in FIG. 24.

In the explanation of the above embodiments, the explanation was given with reference to an example of use of a hard disk (HD) 21 as the data storage memory, but the system may be similarly configured even when using another data storage memory, that is, an external recording device 31 (USB memory 31A or an FD, CD, or other external recording device 31B).

Next another embodiment of the information management system 32 according to the present invention will be explained. This embodiment is a modification of the operation of the information management system 32 explained above.

First, referring to FIG. 17 and FIG. 18 etc., above, the initial processing for encrypting an original file 51 to a color file 41 was explained. With this initial processing, as explained above, only naturally, in the hard disk 21, there may be a state where the original file before the initial processing and the color file after the initial processing is finished coexist. Therefore, in such a state, the operator or an intruder from the outside etc. could move or copy from the hard disk 21 to a USB memory 31A or other external recording device 31 or other computer unit the original file 51 before initial processing and could try to take out the original file from the computer 10. In such a case, the above-mentioned encrypting means 44 is used to automatically encrypt the original file to a color file and move or copy it to a USE memory 31A etc. That is, when there is a request from the outside etc. to move or copy an original file before initial processing to an outside USE memory etc., the information management system 32 uses the information management function (encrypting initial processing function) shown in FIG. 17 and FIG. 18 etc. as the basis to encrypt this original file by the encrypting means 44 to an encrypted file and moves or copies this to the USE memory 31A etc. This hardware configuration becomes the configuration shown in FIG. 17 and FIG. 18 wherein the generated color file 41A is stored in the USE memory 31A etc. instead of being stored in the hard disk 21. Therefore, the format of the file which is stored in the USB memory 31A etc. becomes an encrypted color file 41A. For this reason, a third party not having the ONC correspondence table etc. cannot learn the content of the information.

Further, in the above, in a request for moving or copying an original file before encryption initial processing to an outside USB memory etc., the original file before the encryption initial processing is encrypted to an encrypted file at the point of time when the movement destination or copy destination is designated.

In the configuration of above embodiments, it is preferable to add a memo region part to the original file which is encrypted to a color file and to add to the memo region part for example the "PC identification number", "HD serial number", or other information. By employing this configuration, password authentication becomes unnecessary.

Next, referring to FIG. 33 and FIG. 34, the specific framework of the color encryption (or encrypting means 44) explained by FIG. 17 etc. will be explained in further detail.

Figure 33:
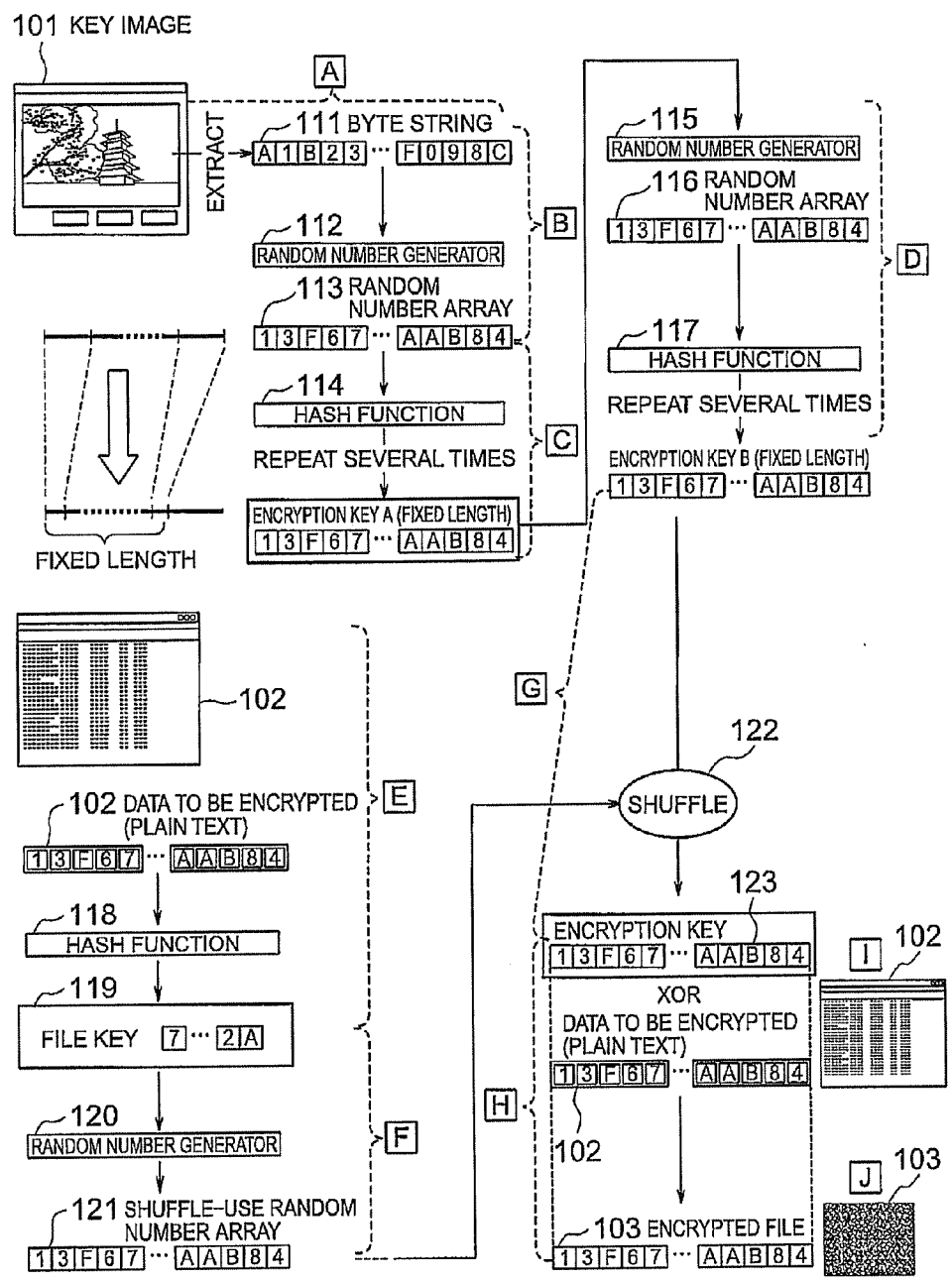
FIG. 33 is a view illustrating a flow of processing (algorithm) for color encryption.
Figure 34:
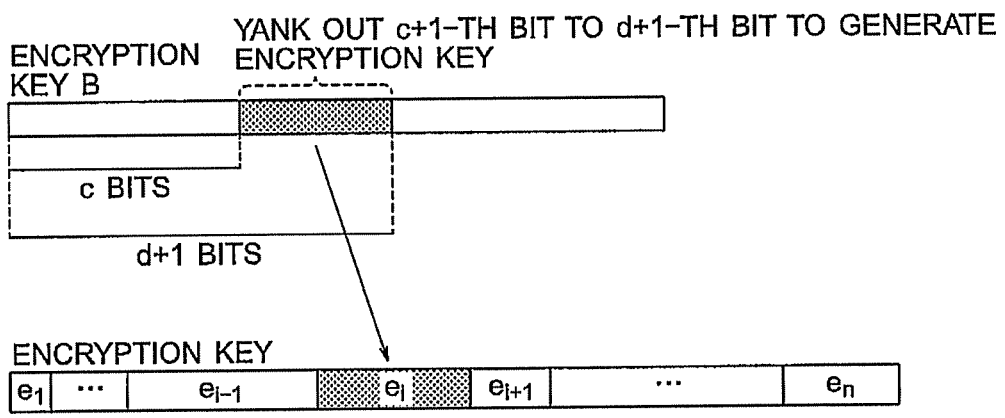
FIG. 34 is a view illustrating a method of creating an encryption key.

FIG. 33 is a view illustrating the flow of processing (algorithm) for color encryption, while FIG. 34 is a view illustrating the method of creation of an encryption key.

With this encryption system, the data to be encrypted (plain text) is subjected to an XOR operation in bit units by an encryption key, which is prepared by the following routine, so as to prepare an encrypted file. The data to be encrypted and the encryption key are equal in size. Further, conversely, with this encryption key, the encrypted file is again subjected to an XOR operation and decrypted. This encryption is a common key type of encryption.

In FIG. 33, 101 indicates a "key image", 102 indicates an original file of data to be encrypted (plain text) (for example, a document file), while 103 indicates a color file which is prepared as a result of encryption processing.

For the key image 101, typically a color photo image is used, but the invention is not limited to this. For the color photo image, for example a not problematic suitable image which is shown in a book etc. is used. Furthermore, for the color photo image, it is also possible to use a similar image which is shown on the display screen of an e-book reader.

As the original file 102, in this example, document data which is displayed on a browser is used.

The processing (algorithm) of color encryption shown in FIG. 33 utilizes the key image 101 to encrypt the original file 102 to prepare the color file 103. This includes eight steps (A), (B), (C), (D), (B), (F), (G), and (H). Below, these steps (A) to (H) will be explained.

Step (A): This step is a step of extracting the data 111 (bit array, byte string) from the key image 101.

What extent of length (number of bits) to make the extracted array is freely determined based on the relationship with the following generation of a random number. Since this key image 101 is used to generate the later mentioned encryption key, the key image plays a role similar to a password which is utilized at the time of ordinary encryption. The size of the extracted data 111 is made about half of the image, that is, several thousands to several tens of thousands of bytes as a general yardstick. Further, the grounds for an extraction size being satisfied for which a full search is de facto impossible from the standpoint of current computer performance will be explained later in the section on "regarding cracking by full search".

Step (B): This step is a step of generating a random number.

Here, the "random number" means all pseudo random numbers. The above extracted data is set as the initial value (seed) of the random number generator 112 and a random number array 113 is generated. Note that it is desirable that the difference in the random number array 113 due to a difference in the initial value be sufficiently noticeable.

Step (C): This step is a step of preparing an encryption key A.

The above random number array 113 is divided into suitable lengths (fixed lengths), the parts are used as the input values (keys) for the hash function 114 to find hash values, and these are combined to prepare the encryption key A. This encryption key A, together with the later explained file key, enables reproduction of an encryption key. For this reason, use such as movement and storage at a location separate from the encryption application may be considered.

To answer this, other than the viewpoint of the encryption strength, it is necessary to consider the traffic load on the network and determine the size (compactness) so that handling of data becomes possible without obstruction. This is named the "size suitability" of the encryption key A. This becomes a numeral value of a natural range. The number of times of use of the hash function (repetition) is determined conditional on the sum of the lengths of the hash values (output length) meeting this size suitability.

Note that this is conditional on the key (input) length of the hash function being sufficiently larger than the output length.

Step (D): This step is a step of preparation of an encryption key B.

The above encryption key A is used as an initial value (seed) for generation of a random number array 116 at the random number generator 115. The hash function 117 is used to divide the random number array 116 into suitable lengths, find hash values, and combine these to prepare a suitable length of a bit string which is then called an "encryption key B". Partial arrays of this encryption key B are extracted and rearranged to obtain an encryption key. Refer to the "shuffle" of step (F) shown in FIG. 33. To guarantee the randomness of the bit array of the encryption key, the length of this encryption key B is made longer than the encryption key A.

The operations up to the above steps (A) to (D) can be performed at the time the key image 101 is determined. This is preferable. The routine for encrypting data to be encrypted (plain text) (steps (E) to (H)) assuming this will be explained below.

Step (E): This step is a step of preparation of a file key. In this step, the data to be encrypted (plain text) 102, that is, the original file 102, is entered into the hash function 118 to obtain a bit array which is used as the file key 119.

Step (F): This step is a step of preparing a random number array for shuffling use. At this step, the file key 119 is used as the initial value to allow the random number generator 120 to generate the random number array 121 for shuffle use.

Step (G): This step is a step of preparation of an encryption key.

The above prepared encryption key B and shuffle-use random number array 121 are used for shuffling 122 to prepare an encryption key 123.

The shuffle-use random number array 121 is divided into suitable lengths of "L" bits (fixed).

As the condition of "L", $2^L \geq$ (bit length of encryption key B) is suitable. The "L" bit parts of the divided bit array are converted to numerical values to obtain $a_i$, $b_i$ (i=1, 2, ...) (shown in FIG. 34).

Next, the remainders after dividing $a_i$ and $b_i$ by the bit length of the encryption key B are designated as $a_i^*$ and $b_i^*$.

That is, $a_i^* = a_i$ mod (bit length of encryption key B)
$b_i^* = b_i$ mod (bit length of encryption key B)

At this time, $0 \leq a_i^* \leq$ (bit length of encryption key B)−1
$0 \leq b_i^* \leq$ (bit length of encryption key B)−1

Therefore, $1 \leq a_i^* + 1 \leq$ (bit length of encryption key B)
$1 \leq b_i^* + 1 \leq$ (bit length of encryption key B)

Now, compare the magnitudes of $a_i^*$ and $b_i^*$ and designate the larger one as "c" and the smaller one as "d".

The c+1 bit to d+1 bit bit arrays of the encryption key B are designated as $E_i$ (bit length of $e_i$) and combined with $E_i$−1.

At this time, $e_1 + e_2 + \ldots + e_{i-1} + e_i <$ bit length of plain text

If so, continuing after this, $E_{i+1}$ is prepared for $a_{i+1}$, $b_{i+1}$, and the combined array $E_1 + \ldots E_{i+1}$ is prepared. This is continued until the sum of the lengths exceeds the bit length of the plain text.

If $e_1 + e_2 + \ldots + e_{i-1} + e_i \geq$ plain text bit length, the combined $E_1 + E_2 + \ldots + E_{i-1} + E_i$ of the bit array is made the encryption key 123.

Step (H): This step applies an XOR operation to the data to be encrypted (plain text), that is, original file 102, in bit units by the encryption key 123 and encrypts the result to prepare a color file (encrypted file) 103.

When decrypting the color file (encrypted file) 103 prepared in the above way, the encryption key B and the file key 119 are used to reproduce the routine of steps (D), (F), and (G)

shown in FIG. 33 so as to prepare the encryption key 123. Further, this encryption key 123 is used to apply an XOR operation to the color file (encrypted file) 103 to thereby decrypt this to the data to be encrypted (plain text), that is, original file 102.

Next, cracking by a full search relating to the color encrypting method of the present invention will be explained.

Assume that a 10-byte (10 alphanumeric) password setting is cracked by a full search in $10^{-n}$ seconds (if n=3, 1 millisecond, if n=6, 1 microsecond, and if n=9, 1 nanosecond).

At this time, let us calculate in about how long a time a 10 times greater 100 byte (100 alphanumeric) password setting can be cracked.

When employing the key image according to the present invention, this corresponds to setting a password of thousands to tens of thousands of characters as explained before.

When setting a 10 byte password, the conceivable cases become $$256^{10}=(2^8)^{10}=2^{80} \qquad (1)$$

Similarly, in the case of 100 bytes, they become $$256^{100}=(2^8)^{100}=2^{800} \qquad (2)$$

If, to crack (1), it takes $10^{-n}$ seconds, while to crack (2), it takes x seconds, then $$2^{80}:2^{800}=10^{-n}:x$$

$$x=(2^{800})\times 10^{-n}/2^{80}=2^{720}/10^n \text{(seconds)}$$

If converting this to years, $$2^{720}/(10^n \times 60 \times 60 \times 24 \times 365) \text{(years)}$$

To show how large an order of magnitude (y digits) this value is by the binary method, the following is set:

$$10^y=2^{720}/(10^n \times 60 \times 60 \times 24 \times 365)$$

If taking the (natural) log of the two sides, $$y \log 10 = 720 \cdot \log 2 - n \cdot \log (10 \times 60 \times 60 \times 24 \times 365)$$

$$y=(720 \cdot \log 2 - n \cdot \log (10 \times 60 \times 60 \times 24 \times 365))/\log 10$$

At this time,
when n=3 ⇒ y≈191
when n=6 ⇒ y≈166
when n=9 ⇒ y≈140

Now then, a CPU with a clock frequency of 1 GHz has a basic circuit which performs 1 billion ($=10^9$) operations per second. Assume that a single operation enables one case in a full search to be judged. If so, the time required for a full search of a 10 byte password by an nGHz performance CPU would become, $$2^{80}/(n \times 10^9)\text{(seconds)}=2^{80}/(n \times 10^9 \times 60 \times 60 \times 24 \times 365)$$
(years)

Even if using a CPU of a performance of about 1000 times that of a 1 GHz CPU (n=$10^3$), $$2^{80}/(10^{12} \times 60 \times 60 \times 24 \times 365)\text{(years)} \approx 40{,}000 \text{ years}$$

of time would be required. Considering this, it will be understood that the assumption that a 10 byte password setting could be cracked in 1 millisecond (1/1000th of a second) is extraordinarily generous, but the calculations will be proceeded with for maintaining this.

If, by a full search, a 10 byte (10 alphanumeric) password setting can be cracked in 1 millisecond (1/1000th of a second), the time required for cracking a 100 byte (100 alphanumeric) password can be expressed by an about 190 order of magnitude of number of years.

By way of note, the time from the creation of the earth to the present is believed to be about 5 billion years. This corresponds to an order of magnitude of at most about 10.

Compared with the age of the earth, the time required to crack a 100 byte password is about $10^{190}/10^{10}=10^{180}=(10^{90})^2$ times larger. Just how big this is can be understood from the following.

Assume that the total number of atoms in the entire universe is (somewhat largely) $10^{90}$ and that we count each of these (by the same speed).

If counting up the total number of atoms repeatedly for each atom, the count will end at $10^{90} \times 10^{90}=(10^{90})^2$.

If the time required for this operation is assumed as the time required for cracking a 100 byte password, the 5 billion years of the "age of the earth" would only correspond to the time required for counting one atom.

In the above color encrypting method, at step G for preparing the encryption key, shuffling 122 was performed to prepare the encryption key 123, but it is also possible instead to use the technique of "block encryption".

Below, first, "block encryption" will be explained.

A function in which an $N_b$ bit block and an $N_k$ bit key are input and from which an $N_b$ bit block is output as encryption is called "block encryption (type of common key encryption". This is comprised of two algorithms of encryption E and decryption $E^{-1}$. When k is a length $N_k$ bit key and m is a length $N_b$ bit plain text, $$E_k^{-1}(E_k(m))=m$$

stands. That is, this shows that what has been encrypted can be decrypted.

As typical "block encryption", there is the AES (Advanced Encryption Standard) established by the NIST of the U.S. or the MISTY1 or Camellia etc. made by Japan.

Next the encryption method using the above "block encryption" will be explained.

As one request made on encryption, encrypted loading after objective assessment by a public organization is sometimes sought. For example, on Feb. 20, 2003, the Japanese Ministry of Internal Affairs and Communications and the Japanese Ministry of Economy, Trade, and Industry announced a list of recommended encryption for electronic government. The algorithm in the case of using a common key type of block encryption for encryption to respond to this request will be explained below. Note that, as the attributes of the block encryption used, attributes beyond those of the above "block encryption" are assumed to not be sought.

The process until preparing the "encryption key 123" after the "shuffling 122" in FIG. 33 is based on known algorithms. However, this time, the prepared encryption key 123 is used as a key for block encryption.

Figure 35A:
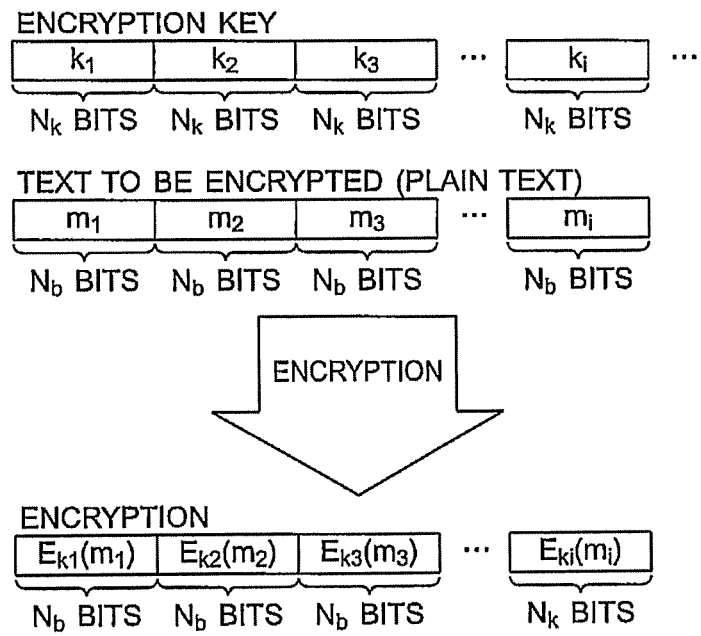
FIG. 35A is a view showing the state of using an encryption key and block encryption (function) E for encryption.
Figure 35B:
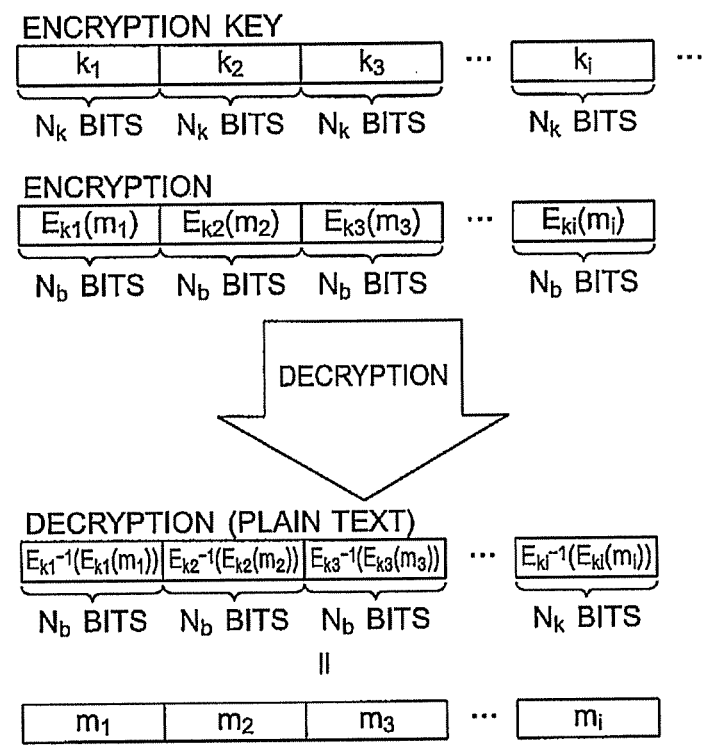
FIG. 35B is a view showing the state of using an encryption key and block encryption (function) $E^{-1}$ for decryption.

FIG. 35A and FIG. 35B show the state of use of this encryption key and block encryption (functions) E and $E^{-1}$ for encryption and decryption. FIG. 35A shows the encryption, while FIG. 35B shows the decryption.

First, the encryption key is divided in lengths of $N_k$ bits. These bit arrays are expressed by $k_1, k_2, k_3, \ldots, k_i, \ldots$. Similarly, the text to be encrypted (plain text) is also divided into lengths of $N_b$ bits. These bit arrays are expressed by $m_1, m_2, m_3, \ldots, m_j$. At this time, block encryption (function) E is used to replace the bit arrays mj by $E_{kj}(m_j)$ (j=1, 2, 3, ...) to thereby encrypt the text to be encrypted (plain text).

Further, to decrypt such encrypted data, an encryption key and $E-1^{-1}$ are utilized to apply $E_{kj}^{-1}$ to the bit array $E_{kj}(m_i)$ and return it to $E_{kj}^{-1}(E_{kj}(m_j))=m_j$ (j=1, 2, 3, ...) for decryption.

In the explanation of the embodiments given above, the computer system 10 shown in FIG. 1 etc. was envisioned as a PC. The computer system 10, as explained above, may also be a server. Therefore, the system configuration in the case of assuming the computer system 10 to be a server will be explained.

If the computer system 10 is a server, the server constituted by the computer system 10 is connected through a network to a plurality of clients (other computer systems) and send and receive various types of files with these clients. These various types of files are handled and encrypted as original files. According to the configuration shown in FIG. 1 and FIG. 2, when the computer system 10 is a server, the other computer system 27 becomes a client. Such a system configuration of a server and client is, for example, employed in the configuration of an in-house network of a business etc., a configuration installing a server in company units, a configuration installing a server in an in-house LAN, etc.

Figure 36A:
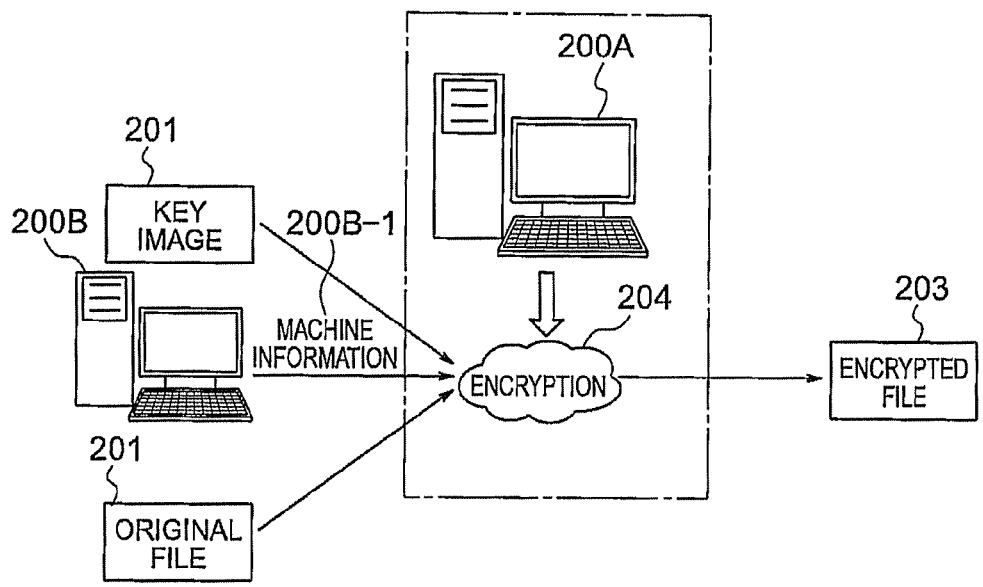
FIG. 36A is a view showing the relationship between a server and a client in encryption utilizing a key image.
Figure 36B:
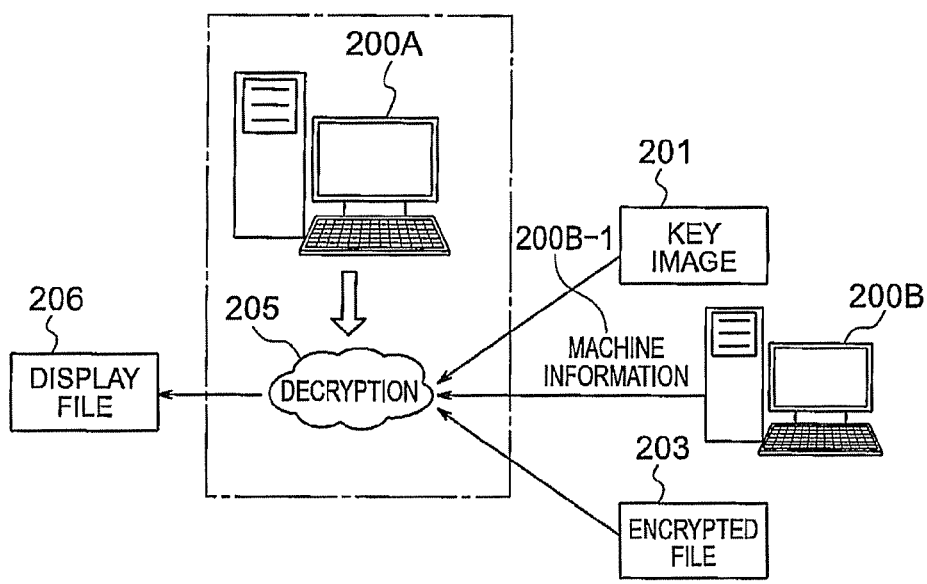
FIG. 36B is a view showing the relationship between a server and a client in decryption utilizing a key image.

FIG. 36A shows the relationship between a server and a client in encryption using a key image, while FIG. 36B shows the relationship between a server and client in decryption using a key image. In FIG. 36A and FIG. 36B, 200A indicates a server, while 200B indicates a client.

According to FIG. 36A, the server 200A confirms the machine information (identification information of used machine) 200B-1 of the client 200B, uses the key image (password) 201 to encrypt the original file 202 (processing 204), and prepares an encrypted file (color file) 203. Further, according to FIG. 36B, the same server 200A confirms the machine information 200B-1 of the client 200B, uses the key image (password) 201 to decrypt the encrypted file (color file) 203 (processing 205), and prepares a display file 206 (corresponding to original file 203). In the encryption processing of FIG. 36A and the decryption processing of FIG. 36B, the machine information 200B-1 is judged to be legitimate.

The above encryption processing 203 and decryption processing 205 are basically the same in content as the color encryption processing (algorithm) explained in FIG. 33.

According to the configuration shown in FIG. 36A and FIG. 36B, the server 200A loaded with the color encryption program according to the present invention has the functions (roles) of a "gatekeeper", "key image management", "communication relay", and "web service" as explained below.

Function as "Gatekeeper": The server 200A has the role of maintaining the same security as for example the check-in counter at an airport. A client 200B can only access a server 200A and send and receive information with the server 200A on the condition of him or her legitimately having an authentication ID (legitimate user) and able to legitimately access the server 200A which is installed in the in-house network etc. (legitimate used machine). A client or external computer which does not meet these conditions cannot access the server 200A. Due to this, by limiting access to persons able to legitimately access the server 200A, a certain degree of security can be secured. Furthermore, a person who illicitly accesses the server 200A will leave his or her machine information in the records of the server and can be searched for illicit intrusion.

Function of "Key Image Management": The key image 201 corresponds to a "password" and is stored in the server 200A. The key image 201, even if copied, taken out, and lost at the outside of the server 200A, can be acquired again. Further, the key image 201 differs from a conventional ordinary password in that even if the key image 201 is leaked together with an encrypted file, it is not enough for decryption. The server 200A does not record the image data itself of the key image. It encrypts and stores just enough data for decryption.

Function of "Communication Relay": In an in-house network etc., it would be convenient if it were possible to attach an encrypted file 203 to e-mail sent to users in the firm. Even if the encrypted file 203 were leaked to the outside, it could only be decoded by an authorized user able to access the server 200A, so the file has high security. Due to this, in the in-house network etc., a configuration of "encryption of a file by a shareable mode" is realized. If sending an encrypted file 203 to another user in this way, it is not necessary to simultaneously send a key for decrypting the encrypted file 203. The other user obtains the key image information by another means from the server 200A. In this way, the server 200A functions as a relay device between a user which has prepared an encrypted file 203 and another user which decrypts the encrypted file 203.

Function of "Web Service": As a means for communication between a client 200B and a server 200A, a "web service" is used. This web service is also called a "SOAP (Simple Object Access Protocol)". The communication protocol of a web service is exactly the same as that which a web server uses. In general, a web server sends a media stress display standards on a web browser, that is, the HTML, to the client (web browser). On the other hand, a web service sends and receives a media called XML which stresses data communication. A web service uses the HTTP as the communication protocol, so if a PC which can use a web browser to view a website, any PC can utilize the web service. That is, there is no need to set complicated PC settings. Furthermore, in accordance with need, communication between the server 200A and the client 200B can be encrypted using established encryption technology of web servers.

In general, according to the functions of the information management system according to the present invention, which is built into a PC (including a client) or a server etc. like the above and which has encryption software using color files, or according to the framework for such encryption, there are the following characterizing features:

The present encryption software, when using data once encrypted to a color file, confirms that the user or used machine is legitimate, then automatically decodes the data to the original file ("plain text" etc.) and transfers control over to an application which is concluded to be related to the original file. Therefore, as explained with reference to FIG. 4 and FIG. 5 etc. viewing, editing, and other work is performed as usual. At the time when a file finished being worked on is stored, the present encryption software is again controlled by the application and automatically encrypts the stored original file. As a result, only encrypted color files are stored in the data storage memory (hard disk 21 etc.) Therefore, raw information in the original file state is prevented from being leaked to the outside.

To decode the encrypted file 203, as shown in FIG. 36B, it is required that all conditions of the key image (image corresponding to password) 201 used at the time of encryption, machine information (identification information) 200B-1 of the machine 200B used, and authentication by the server 200A be cleared.

Further, the encryption software of the present invention has the advantage of enabling both "construction and loading of uncrackability making it impossible to decrypt an original file (plain text) from an encrypted file (encrypted text)" and "provision of a function enabling authorized users to proceed with work without over consciousness of encryption and decryption and preventing in advance leakage of data to the outside due to one's own carelessness or a malicious third party".

A color file which is encrypted by the present encryption software is without contention a single image. According to the present encryption software, the encrypted file is envisioned not as a "meaningless image", but a color file which does not exclude the possibility of being able to be read if desiring to read its meaning. This point is the core of the encryption concept and is not found in existing encryption software.

That is, conventional encryption software was conceived as so-called secondary insurance with the assumption/framework that even if an encrypted file were leaked to the outside, it could not be or substantially could not be cracked, but leakage to the outside had to be avoided in any case. As opposed to this, the characteristic of the color file of the present invention, which has the ultimate uncrackability of cracking being meaningless, is that important data is not concealed, but rather is circulated over networks freely as a color file which can be selectively distributed using the decryption function of the present encrypting software as a decryption key.

In particular, in the case of delivering data to an unspecified number of parties such as with delivery of movies and downloading of e-books and music, the information is converted to a color file for circulation. The present encryption software shows its true value in this. At that time, the encrypted color file is substantially the same in size as the original file (plain text). There characteristic results in the advantage that current data compression schemes can be utilized as they are.

The configurations, shapes, sizes, and relative layouts explained in the above embodiments are only shown schematically to an extent enabling the present invention to be understood and worked. Therefore, the present invention is not limited to the embodiments explained above and can be changed in various ways so long as not departing from the scope of the technical ideas shown in the claims.

The information management system according to the present invention etc. manages information which is handled on a computer or through a computer. It converts the file information of all files (document files or executable files including programs etc.) to typically color files. By doing this, routine work on the computer is possible. Therefore, while enabling use of the computer without any odd feeling, this can be expected to be utilized for stopping, blocking, preventing, and protecting against leakage, preventing destruction, and preventing tampering and alteration by malicious third parties. Therefore, the invention can be worked in fields where there is concern over leakage in use of computers and where leakage may cause damage. Great use and application in numerous industrial fields where leakage is a concern can be expected.

The present disclosure relates to subject matter contained in Japanese Patent Application No. 2009-290282 filed on Dec. 22, 2009, the entire contents of which being clearly incorporated herein by reference.

The invention claimed is:

1. An information management system for managing data on a computer, the system comprising:
a color-based encrypting means for encrypting a file by an information substitution-type conversion function or an information conversion-type conversion function into an encrypted file, a selected conversion function converting at least a portion of information stored in the file into at least one of a color name (C) or a numerical value representing a color (N);
a data storage memory which stores the encrypted file,
a color-based decrypting means, which has a conversion function which is an inverse of the conversion function of the color-based encrypting means,
a working memory, and
an information managing means for:
enabling the display and viewing of or performing an operation on the encrypted file, which is stored in the data storage memory, by decrypting the encrypted file by the color-based decrypting means into an editable file, and storing the editable file in the working memory,
performing editing or execution of the editable file, and
converting the editable file by the color-based encrypting means into a new encrypted file and storing the new encrypted file in the data storage memory,
the data storage memory further provided with an information management file which controls the processing of encrypted data at the information managing means.

2. An information management system as set forth in claim 1, wherein the data storage memory stores only the encrypted file and does not store the file corresponding to the encrypted file.

3. An information management system as set forth in claim 1, wherein the data storage memory stores the file together with the encrypted file.

4. An information management system as set forth in claim 1, wherein color-based encryption includes:
the substitution of file information via a substitution type conversion function, the substitution-type conversion function corresponding to an ONC correspondence table (ONC denoting correspondence between at least two of a computer object (O), the numerical value representing a color (N), and the color name (C)), and
the conversion of file information via a conversion type conversion function corresponding to a color-based encryption encryption/decryption key.

5. An information management system as set forth in claim 1, further provided with a startup means for comparing a computer identification number embedded in a system executable file forming part of the information managing means against a computer identification number uniquely assigned to the computer which is used and, when the two match, starting up and, when they do not match, not starting up.

6. An information management system as set forth in claim 1, wherein the information management file includes, as component elements for processing of or operation on the encrypted file, at least one of an ONC correspondence table identification number list, (ONC denoting correspondence between at least two of a computer object (O), the numerical value representing a color (N), and the color name (C)), an organization division/rank management table, a file double management table, appended matter, and an external recording device identification number list.

7. An information management system as set forth in claim 6, wherein
the color-based encrypting means uses an ONC correspondence table designated by an ONC correspondence table identification number in the ONC correspondence table identification number list which is included in the information management file as the basis to color encrypt the file at the time of initial processing so as to prepare the encrypted file, and
the color-based decrypting means or the color-based encrypting means uses the designated ONC correspondence table to decrypt the encrypted file or encrypt the file again in a regular operational processing cycle.

8. An information management system as set forth in claim 6, further provided with a takeout prohibiting means for prohibiting takeout of file information by an external recording device based on the external recording device identification number list which is included in the information management file.

9. An information management system as set forth in claim 8, wherein the takeout prohibiting means, when an external recording device is connected to the system, uses the external recording device identification number list which is included in the information management file as the basis for comparison with an identification number of the external recording device, permits use when the comparison results in a match, and does not permit use when there is no match.

10. An information management system as set forth in claim 7, wherein
the color-based decrypting means or the color-based encrypting means uses the ONC correspondence table as the basis for encryption and decryption at the time of initial processing or at a regular operational processing cycle,
the system is provided with a correspondence table changing means for changing the ONC correspondence table,
the correspondence table changing means changes the ONC correspondence table, the ONC correspondence table changed due to this being used as a basis to prepare another encrypted file, and
the other encrypted file is able to be decrypted based on the ONC correspondence table after the change and is not able to be decrypted based on the ONC correspondence table before the change.

11. An information management system as set forth in claim 10, wherein the ONC correspondence table is changed based on a change of OC correspondence, a change of ON correspondence, or a change of NC correspondence.

12. An information management system as set forth in claim 7, wherein
the color-based decrypting means or the color-based encrypting means uses the ONC correspondence table as the basis for encryption or decryption at the time of initial processing or at a regular operational processing cycle,
the system is provided with a correspondence table deleting means for deleting an ONC correspondence table, and
the correspondence table deleting means deletes the ONC correspondence table and, due to this, decryption processing is disabled.

13. An information management system as set forth in claim 10, which sets conditions for change or deletion of the ONC correspondence table to thereby limit use of the decryption function or limit use of a display file which is decrypted from an encrypted file.

14. An information management system as set forth in claim 10, which sets conditions of the timing for change or deletion of the ONC correspondence table to thereby perform at least one of limitation of the term, limitation of the time, establishment of a deadline, and limitation of the number of times of execution.

15. An information management system as set forth in claim 6, which uses the appended matter which is included in the information management file as the basis for automatic or manual conditional execution control, in accordance with appended conditions which are included in the appended matter, of encryption processing, decryption processing, file operations, and file input and storage.

16. An information management system as set forth in claim 15, which prevents alteration, tampering, editing, and copying of a display file, a homepage, or a display/viewing screen, which is displayed in accordance with the appended conditions which are included in the appended matter, by a third party.

17. An information management system as set forth in claim 15, which is configured to automatically or manually perform conditional execution control of file operations and file input and storage of the file in accordance with the appended conditions of the appended matter.

18. An information management system as set forth in claim 15, which is configured to automatically or manually perform conditional execution control of file operations and file input and storage of an encrypted file in accordance with the appended conditions of the appended matter.

19. An information management system as set forth in claim 15, which is configured to automatically or manually perform conditional execution control of file operations of a display file in accordance with the appended conditions of the appended matter.

20. An information management system as set forth in claim 15, which is configured to encrypt an executable file and disable execution when execution is not permitted in accordance with the appended conditions of the appended matter.

21. An information management system as set forth in claim 15, which is configured to encrypt an e-mail and disable transfer of a display file when transfer is not permitted in accordance with the appended conditions of the appended matter.

22. An information management system as set forth in claim 15, which is configured to encrypt a printer driver and disable printing of a display file when printing is not permitted in accordance with the appended conditions of the appended matter.

23. An information management system as set forth in claim 1, wherein, in the steps where the color-based encrypting means encrypts the file to the encrypted file as initial processing, the color-based decrypting means decrypts the encrypted file to the display file, and the color-based encrypting means again encrypts the display file to the encrypted file, except for the file, the encrypted file and the display file, elements which are used for the encryption, and elements which are used for the decryption are set with a computer identification number which is uniquely assigned to the computer.

24. An information management system as set forth in claim 1, wherein,
for computer objects of the file which is managed at the computer under the control of the information management system,
the system is configured to enable editing, execution, storage, and deletion of computer objects in the state of the display file,
a closed loop environment at the computer is formed based on the state of the encrypted file, and
the computer objects in the state of the encrypted file are handled in the closed loop environment.

25. An information management system as set forth in claim 24, wherein when the computer objects are stored in the storage memory in the state of the encrypted file, the corresponding file is deleted.

26. An information management system as set forth in claim 1, wherein the system
provides an external recording device which can be attached to or detached from the computer and which includes a first recording unit which records an already obtained encrypted file and/or a second recording unit which records elements relating to a conversion function of at least one of an information substitution type and information conversion type and
provides contents which are recorded in the first recording unit and the second recording unit to the computer as a module and performs encryption processing by the color-based encrypting means, decryption processing by the color-based decrypting means, and processing for control of execution relating to operations on the file when the external recording device is connected to the computer.

27. An information management system as set forth in claim 1, which is configured to use an external recording device which can be attached to or detached from the computer and which is provided with the color-based encrypting means, the storage memory, the color-based decrypting means, the information managing means, and the information management file as a module.

28. An information management system as set forth in claim 1, wherein the computer is a game machine or a unit terminal device.

29. An information management system provided with
a color-based encrypting means for encrypting a file by an information substitution-type conversion function or an information conversion-type conversion function to prepare an encrypted file, a selected conversion function converting at least a portion of information stored in the file into at least one of a color name (C) or a numerical value representing a color (N);
a data storage memory which stores the encrypted file and the file before the encryption initial processing, and
an information managing means for encrypting the file before encryption initial processing by the color-based encrypting means to the encrypted file then moving or copying it to another recording device when there is a request for movement or copying of the file before encryption initial processing to the other external recording device.

30. An information management system as set forth in claim 29, which encrypts the file before encryption initial processing to the encrypted file at the point of time when a movement destination or copying destination is designated in a request for moving or copying the file before encryption initial processing to another external recording device 31. An information management method which is executed in an information management system which uses a color-based encrypting means or a color-based decrypting means to encrypt or decrypt a file and an encrypted file under control based on control-use component elements provided in an information management file, color based encryption including converting at least a portion of information stored in the file into at least one of a color name (C) or a numerical value representing a color (N),
which method
prepares a computer identification number such as a MAC address or board serial number,
adds the computer identification number to the encrypted file, an encrypting-use correspondence table of the color-based encrypting means, and a decrypting-use correspondence table of the color-based decrypting means, and
permits decryption processing of the encrypted file when the computer identification number added to the encrypting-use correspondence table and the computer identification number added to the decrypting-use correspondence table match.

32. An information management apparatus which is used in an information management system which uses a color-based encrypting means or a color-based decrypting means to encrypt or decrypt a file and an encrypted file under control based on control-use component elements provided in an information management file, color based encryption including converting at least a portion of information stored in the file into at least one of a color name (C) or a numerical value representing a color (N),
which apparatus is provided with:
a means for preparing a computer identification number such as a MAC address or board serial number,
a means for adding the computer identification number to the encrypted file, an encrypting-use correspondence table of the encrypting means, and a decrypting-use correspondence table of the decrypting means, and
a means for permitting decryption processing of the encrypted file when the computer identification number added to the encrypting-use correspondence table and the computer identification number added to the decrypting-use correspondence table match.

33. An encryption method having:
a first step of extracting a predetermined bit string from a key image,
the key image representing a color-based encryption key, color based encryption being a process including converting at least a portion of information to be encrypted into at least one of a color name (C) or a numerical value representing a color (N),
a second step of using the predetermined bit string to generate a first random number array and repeatedly using a hash function on the first random number array to create a first encryption key, and
a third step of combining the first encryption key and separately provided data to be encrypted via a color-based encryption method to generate an encrypted file relating to the data to be encrypted.

34. An encryption method as set forth in claim 33, wherein the third step includes
a step of using the first encryption key to create a second encryption key,
a step of using a hash function on the data to be encrypted to create a file key,
a step of using the file key to generate a third random number array,
a step of shuffling the second encryption key by the third random number array to create a third encryption key, and
a step of applying an XOR operation to the data to be encrypted in bit units by the third encryption key to create the encrypted file.

35. An encryption method as set forth in claim 33, wherein the third step includes
a step of using the first encryption key to create a second encryption key,
a step of using a hash function on the data to be encrypted to create a file key,
a step of using the file key to generate a third random number array, a step of shuffling the second encryption key by the third random number array to create a third encryption key, and a step of using the third encryption key as a key for block encryption and using the block encryption as the basis to create the encrypted file from the data to be encrypted.

36. A non-transitory computer-readable storage medium storing computer executable instructions which, when executed by a processor, cause the computer to function as:

a first means for extracting a predetermined bit string from a key image, the key image representing a color-based encryption key, color based encryption being a process including converting at least a portion of information to be encrypted into at least one of a color name (C) or a numerical value representing a color (N), a second means for using the predetermined bit string to generate a first random number array and repeatedly using a hash function on the first random number array to create a first encryption key, and a third means for combining the first encryption key and separately provided data to be encrypted via a color-based encryption method for encryption to generate an encrypted file relating to the data to be encrypted.

37. The computer readable storage medium as set forth in claim 36, wherein the third means includes a means for using the first encryption key to create a second encryption key, a means for using a hash function on the data to be encrypted to create a file key, a means for using the file key to generate a third random number array, a means for shuffling the second encryption key by the third random number array to create a third encryption key, and a means for applying an XOR operation to the data to be encrypted in bit units by the third encryption key to create the encrypted file.

38. The computer readable storage medium as set forth in claim 36, wherein the third means includes a means for using the first encryption key to create a second encryption key, a means for using a hash function on the data to be encrypted to create a file key, a means for using the file key to generate a third random number array, a means for shuffling the second encryption key by the third random number array to create a third encryption key, and a means for using the third encryption key as a key for block encryption and using the block encryption as the basis to create the encrypted file from the data to be encrypted.

* * * * *